US012500847B2

United States Patent
Saito et al.

(10) Patent No.: US 12,500,847 B2
(45) Date of Patent: Dec. 16, 2025

(54) ARITHMETIC PROCESSING OFFLOAD SYSTEM, CLIENT, SERVER, AND ARITHMETIC PROCESSING OFFLOAD METHOD

(71) Applicant: NTT, Inc., Tokyo (JP)

(72) Inventors: Shogo Saito, Musashino (JP); Kei Fujimoto, Musashino (JP); Tetsuro Nakamura, Musashino (JP)

(73) Assignee: NTT, Inc., Tokyo (JP)

(*) Notice: Subject to any disclaimer, the term of this patent is extended or adjusted under 35 U.S.C. 154(b) by 0 days.

(21) Appl. No.: 18/572,295

(22) PCT Filed: Jul. 5, 2021

(86) PCT No.: PCT/JP2021/025339
§ 371 (c)(1),
(2) Date: Dec. 20, 2023

(87) PCT Pub. No.: WO2023/281594
PCT Pub. Date: Jan. 12, 2023

(65) Prior Publication Data
US 2024/0291767 A1    Aug. 29, 2024

(51) Int. Cl.
*H04L 47/43*    (2022.01)
*H04L 47/12*    (2022.01)

(52) U.S. Cl.
CPC .............. *H04L 47/43* (2022.05); *H04L 47/12* (2013.01)

(58) Field of Classification Search
CPC ....... H04L 47/43; H04L 47/12; G06F 9/5027; G06F 2209/509; G06F 9/46; Y02D 10/00
USPC ..................................................... 709/238
See application file for complete search history.

(56) References Cited

U.S. PATENT DOCUMENTS

| | | | |
|---|---|---|---|
| 2013/0247003 A1* | 9/2013 | Seth ..................... | G06F 40/14 717/115 |
| 2020/0394060 A1* | 12/2020 | Chandrappa ........ | G06F 9/45558 |
| 2021/0263779 A1* | 8/2021 | Haghighat ........... | G06F 9/5061 |
| 2022/0156287 A1* | 5/2022 | Zhang .................. | G06F 3/0659 |

OTHER PUBLICATIONS

[No Author Listed], "rCUDA v20.07alpha User's Guide," remote CUDA, Jul. 2020, 32 pages.

* cited by examiner

*Primary Examiner* — Meng Vang
(74) *Attorney, Agent, or Firm* — Fish & Richardson P.C.

(57) ABSTRACT

An operation system of a client includes: an L3/L4 protocol and ACC function and argument data packetizing unit that serializes a function name and argument input from an application side according to a format of a predetermined protocol and packetizes the function name/argument as a payload; and an L3/L4 protocol and ACC function and return value data parsing unit that deserializes packet data input from a server side according to a format of a predetermined protocol and acquires a function name/execution result.

11 Claims, 13 Drawing Sheets

ARITHMETIC PROCESSING OFFLOAD SYSTEM, CLIENT, SERVER, AND ARITHMETIC PROCESSING OFFLOAD METHOD

CROSS-REFERENCE TO RELATED APPLICATIONS

This application is a National Stage application under 35 U.S.C. § 371 of International Application No. PCT/JP2021/025339, having an International Filing Date of Jul. 5, 2021. The disclosure of the prior application is considered part of the disclosure of this application, and is incorporated by reference in its entirety into this application.

TECHNICAL FIELD

The present invention relates to an arithmetic processing offload system, a client, a server, and an arithmetic processing offload method.

BACKGROUND ART

With the progress of cloud computing, offloading some of processing with a large amount of computation from a client machine deployed at a user site to a server at a remote site (such as a data center located in the vicinity of a user) via a network (hereinafter referred to as an NW) to simplify the configuration of the client machine is becoming more common (see Non Patent Literature 1).

FIG. 12 is a diagram illustrating a device configuration of an offload system via an NW.

As illustrated in FIG. 12, the offload system via an NW 1 includes a client 10 deployed at a user site and a server 50 connected to the client 10 via the NW 1.

The client 10 is a terminal that is driven by a battery or the like and has limited computing power.

The client 10 includes client hardware (HW) 20, an operating system (OS) 30, and an application (hereinafter referred to as an APL as appropriate) 40.

The APL 40 includes a client application unit 41, an ACC usage IF 42, and middleware 43. The ACC usage IF 42 is an ACC (Accelerator: compute accelerator device) usage IF specification including OpenCL (Open Computing Language) or the like.

The client application unit 41 is a program executed in a user space. The offload system via the NW is constructed on the premise of use of a defined application programming interface (API) such as OpenCL, and has inputs and outputs with these APIs.

The client 10 does not include a compute accelerator device (hereinafter referred to as an ACC) such as a graphics processing unit (GPU) or a field programmable gate array (FPGA).

The client 10 has a network interface card (NIC) 21 mounted on the client HW 20.

The client application unit 41 is an application that operates on the client 10, and conforms to a standard application programming interface (API) for ACC access. The client application unit 41 operating on the client 10 assumes image processing and the like, and thus requires low operation latency.

The server 50 includes a server HW 60, an OS 70, an APL 80, and an accelerator (ACC) 62 on the server HW 60. The APL 80 includes middleware 81 for offloading.

The server 50 is equipped with one or more accelerators 62.

The server 50 has an NIC 61 mounted on the server HW 60.

The client 10 and the server 50 can communicate with each other via the respective NICs 21 and 61 and the NW 1.

The offload system illustrated in FIG. 12 preferably satisfies the following requirements 1 to 3.

Requirement 1: No change is made to the client application unit 41 (transparency).

Requirement 2: The client side terminal (client 10) does not require hardware such as a special NIC (versatility).

Requirement 3: Overhead in ACC operation offloading via the NW 1 must be small (low delay).

As an existing technology of transparent accelerator processing offloading via an NW, there is "remote offloading of accelerator standard IF functions by packetization of function names/arguments and NW transfer" (see Non Patent Literature 1).

FIG. 13 is a diagram illustrating an accelerator standard IF offload system using an OS protocol stack described in Non Patent Literature 1. In the description of FIG. 13, the same components as those in FIG. 12 are denoted by the same reference numerals.

A solid line arrow in FIG. 13 indicates an offload forward path, and a broken line arrow in FIG. 13 indicates an offload return path.

As illustrated in FIG. 13, the accelerator standard IF offload system includes a client 10 and a server 50 connected to the client 10 via an NW 1.

The client 10 illustrated in FIG. 13 includes client HW 20, an OS 30, and an application (hereinafter referred to as an APL as appropriate) 40.

The OS 30 includes an L4/L3 protocol stack unit 31 and an NIC driver unit 32.

The APL 40 includes a client application unit 41, an ACC function proxy receiving unit 44, an ACC function/return value packetizing unit 45, an ACC function/argument data parsing unit 46, and an ACC function proxy response unit 47.

The server 50 illustrated in FIG. 13 includes a server HW 60, an OS 70, an APL 80, an NIC 61 on the server HW 60, and an accelerator 62.

The OS 70 includes an L4/L3 protocol stack unit 71 and an NIC driver unit 72.

The APL 80 includes a function/argument data parsing unit 82, an ACC function proxy execution unit 83, and an ACC function/return value packetizing unit 84.

Offload Forward Path

The client application unit 41 has input and output with a defined API such as OpenCL.

The ACC function proxy receiving unit 44 is implemented as middleware having an IF compatible with the defined API. The ACC function proxy receiving unit has an IF equivalent to a defined API such as OpenCL, and receives an API call from the client application unit 41. The ACC function proxy receiving unit 44 receives a function name/argument from the client application unit 41 as an input (see reference numeral a in FIG. 13). The ACC function proxy receiving unit 44 passes the function name/argument to the function/return value packetizing unit 45 as an output (see reference numeral b in FIG. 13).

The ACC function/return value packetizing unit 45 passes the transmission packet to the L4/L3 protocol stack unit 31 based on the received function name/argument (see reference numeral c in FIG. 13).

The L4/L3 protocol stack unit 31 causes the input packet to conform to the L4/L3 protocol, and the NIC driver unit 32 passes the transmission packet according to the L4/L3 protocol to the NIC 21 (see reference numeral d in FIG. 13).

The NIC 21 transmits the packet to the NIC 61 of the server 50 connected thereto via the NW 1.

The NIC driver unit 72 of the server 50 receives the packet from the NIC 61 (see reference numeral e in FIG. 13) and passes the packet to the L4/L3 protocol stack unit 71. The L4/L3 protocol stack unit 71 converts the received packet according to the L4/L3 protocol into processable packet data and passes the packet data to the ACC function/argument data parsing unit 82 (see reference numeral f in FIG. 13).

The ACC function/argument data parsing unit 82 deserializes the packet data and passes the function name/execution result to the ACC function proxy execution unit 83 (see reference numeral g in FIG. 13).

The ACC function proxy execution unit 83 offloads the accelerator function/argument data based on the received function name/execution result to the accelerator (ACC) 62 (see reference numeral h in FIG. 13) for execution.

Offload Return Path

The accelerator 62 executes the ACC function and passes the function name/function execution result to the ACC function proxy execution unit 83 (see reference numeral i in FIG. 13).

The ACC function proxy execution unit 83 passes the function name/function execution result from the accelerator 62 to the function/return value packetizing unit 84 (see reference numeral j in FIG. 13).

The ACC function/return value packetizing unit 84 packetizes the passed function name/function execution result and passes the packetized function name/function execution result to the L4/L3 protocol stack unit 71 (see reference numeral k in FIG. 13).

The L4/L3 protocol stack unit 71 causes the packet data to conform to the L4/L3 protocol, and the NIC driver unit 72 passes the packet data conforming to the L4/L3 protocol to the NIC 61 (see reference numeral l in FIG. 13).

The NIC 61 transmits the packet from the NIC 21 of the client 10 connected thereto via the NW 1.

The NIC driver unit 32 of the client 10 receives the packet from the NIC 21 (see reference numeral m in FIG. 13) and passes the packet to the L4/L3 protocol stack unit 31. The L4/L3 protocol stack unit 31 converts the received packet conforming to the L4/L3 protocol into processable packet data and passes the packet data to the ACC function/argument data parsing unit 46 (see reference numeral n in FIG. 13).

The ACC function/argument data parsing unit 46 deserializes the function name/execution result to obtain serial data, and passes the serial data to the ACC function proxy response unit 47 (see reference numeral o in FIG. 13).

The ACC function proxy response unit 47 passes the received serial data to the client application unit 41 as accelerator processing data (see reference numeral p in FIG. 13).

In the above configuration, both the client 10 and the server 50 use dedicated NICs (for example, RDMA HCA: Remote Direct Memory Access Host Channel Adapter) having protocol stack processing functions. Both the client 10 and the server 50 have protocol stack functional units in the NICs 21 and 61, thereby bypassing the protocol stack of the OS kernel.

CITATION LIST

Non Patent Literature

Non Patent Literature 1: "rCUDA v20.07alpha User's Guide", The rCUDA Team, July 2020., [online], [Retrieved on Jun. 4, 2021], Internet <URL: http://www.r-cuda.net/pub/rCUDA_guide.pdf>

SUMMARY OF INVENTION

Technical Problem

However, in the offload system described in Non Patent Literature 1, as illustrated in FIG. 13, the L4/L3 protocol stack unit 31 of the OS 30, the ACC function/argument data parsing unit 46, and the ACC function/return value packetizing unit 45 are independent. Similarly, the L4/L3 protocol stack unit 71 of the OS 70, the ACC function/argument data parsing unit 82, and the ACC function/return value packetizing unit 84 are independent. Therefore, since an overhead occurs in cooperation (parsing, packet generation) between the L4/L3 protocol stack function of the OS and the ACC function/argument data, there is a problem that it is difficult to achieve a low delay.

In addition, since the client 10 illustrated in FIG. 13 requires a dedicated NIC (RDMA HCA), there is a problem that it is difficult to achieve versatility.

The present invention has been made in view of such a background, and an object of the present invention is to achieve a low delay by eliminating an overhead in cooperation between a "protocol stack" of an OS and "ACC function/argument data".

Solution to Problem

In order to solve the above-described problems, according to the present invention, there is provided an arithmetic processing offload system including a client and a server connected to the client via a network, the client offloading specific processing of an application to an accelerator disposed in the server to perform arithmetic processing, in which an OS of the client includes: an accelerator function/argument data packetizing unit that serializes a function name/argument input from the application side according to a format of a predetermined protocol and packetizes the function name/argument as a payload; and an accelerator function/return value data parsing unit that deserializes packet data input from the server side according to a format of a predetermined protocol and acquires a function name/execution result.

Advantageous Effects of Invention

According to the present invention, it is possible to achieve a low delay by eliminating the overhead in the cooperation between the "protocol stack" of the OS and the "ACC function/argument data".

DESCRIPTION OF EMBODIMENTS

An arithmetic processing offload system and the like in a mode for carrying out the present invention (the mode will be hereinafter referred to as "the present embodiment") will be described below with reference to the drawings.

Embodiment

Figure 1:
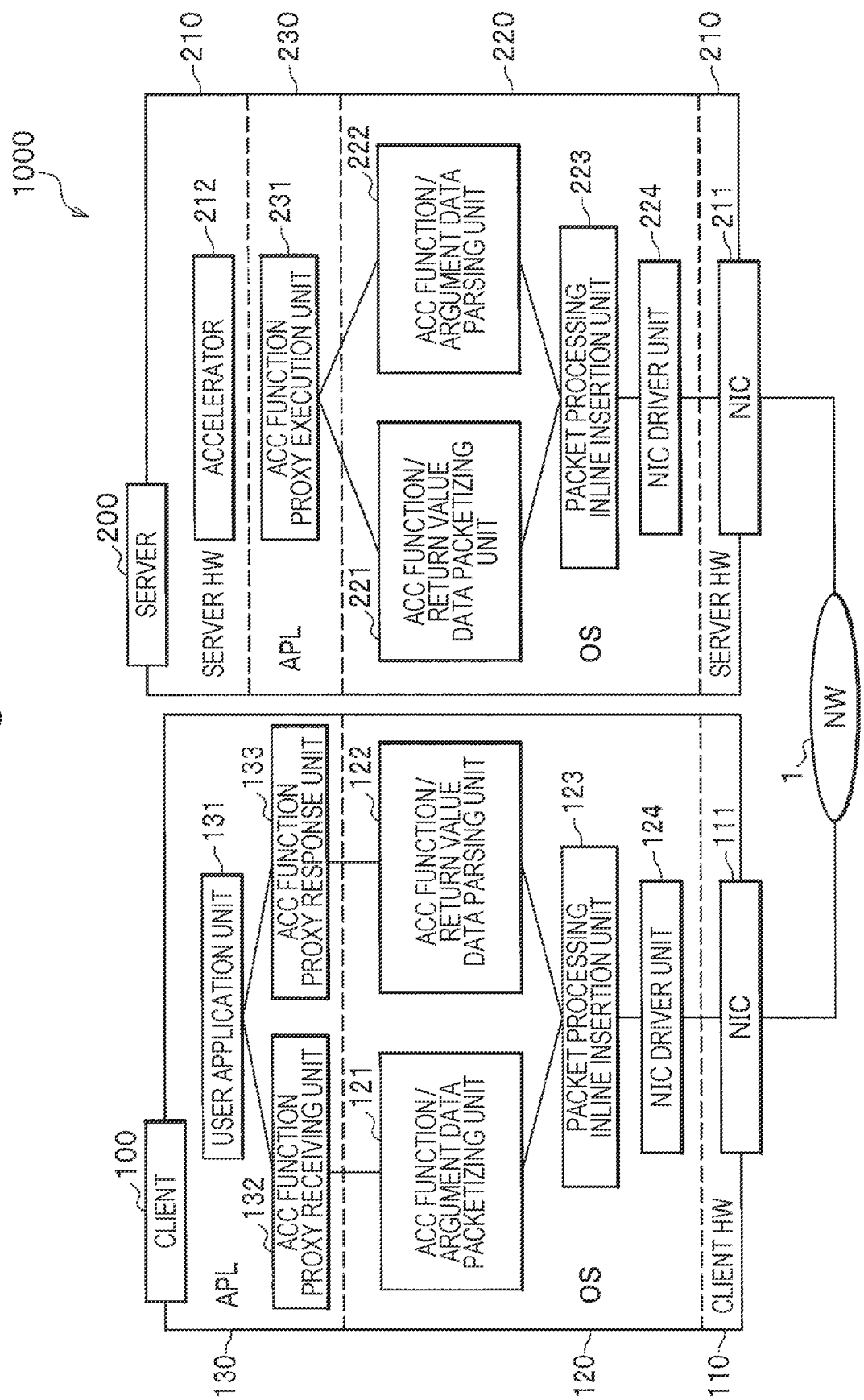
FIG. 1 is a schematic configuration diagram of an arithmetic processing offload system according to an embodiment of the present invention.
Figure 12:
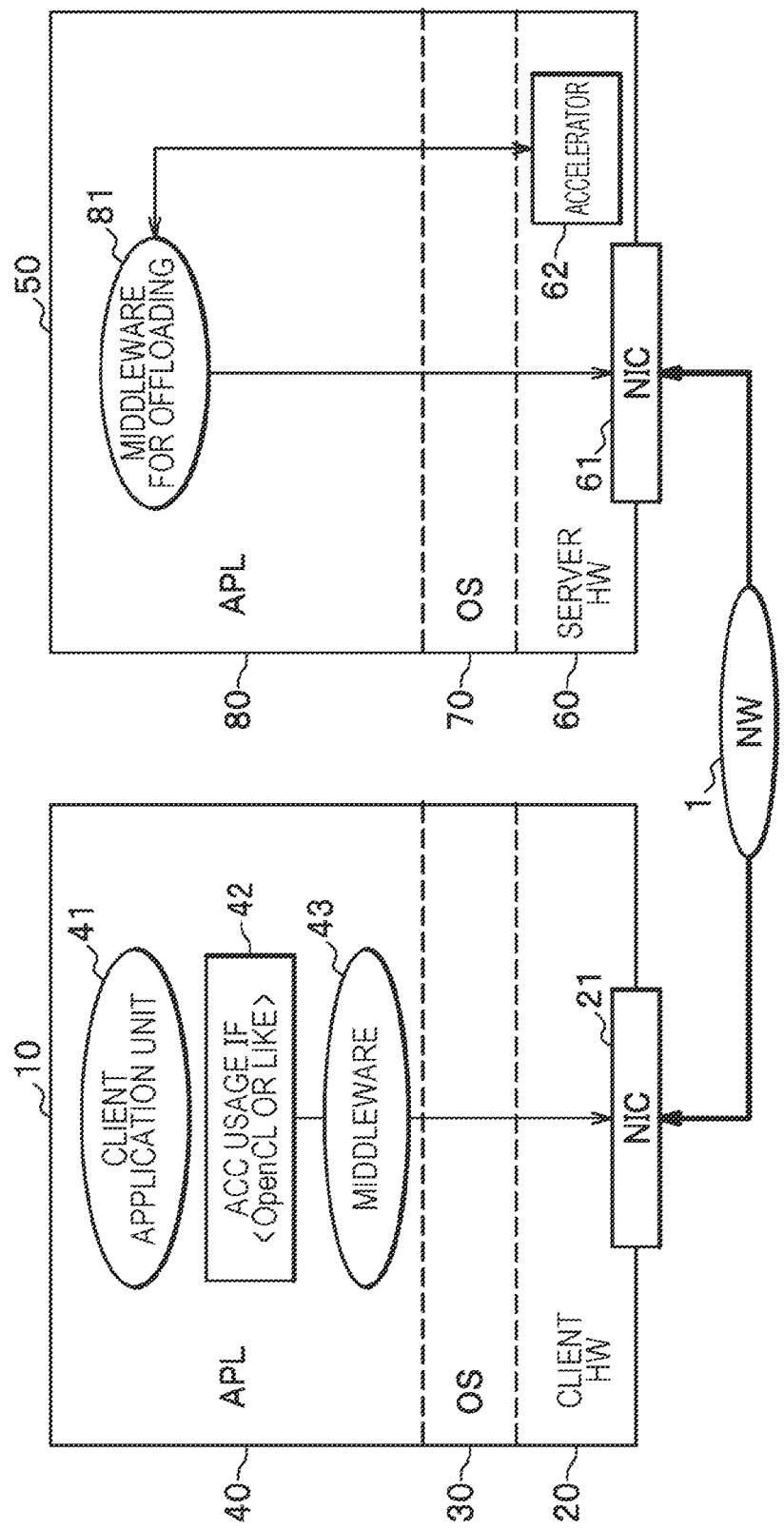
FIG. 12 is a diagram illustrating a device configuration of an offload system via an NW.
Figure 13:
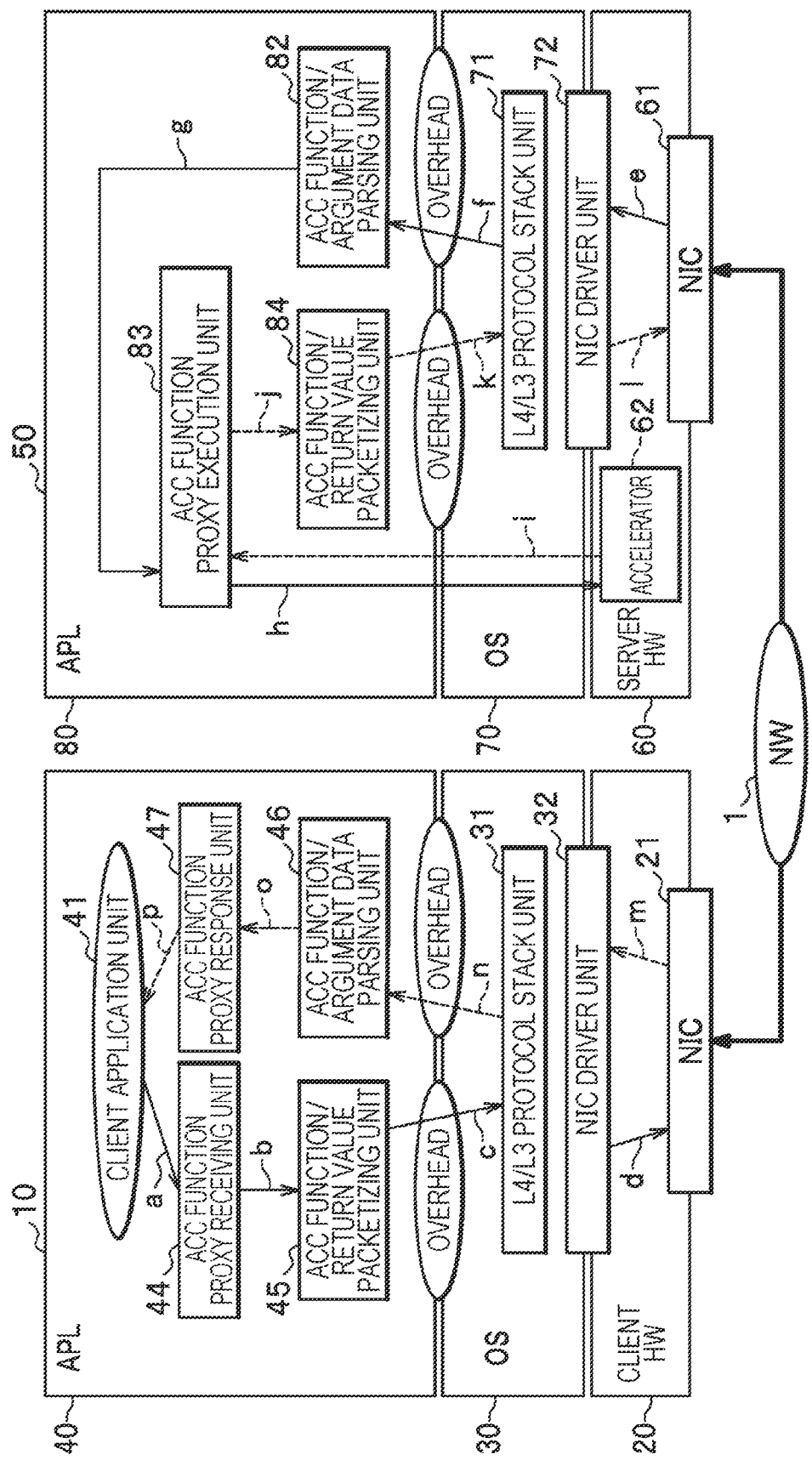
FIG. 13 is a diagram illustrating an accelerator standard IF offload system using an OS protocol stack described in Non Patent Literature 1.

[Outline]
FIG. 1 is a schematic configuration diagram of an arithmetic processing offload system according to an embodiment of the present invention. The present embodiment is an example applied to offload processing using express Data Path (XDP)/Berkeley Packet Filter (eBPF) of Linux (registered trademark). The same components as those in FIGS. 12 and 13 are denoted by the same reference numerals.

As illustrated in FIG. 1, an arithmetic processing offload system 1000 includes a client 100 and a server 200 connected to the client 100 via an NW 1.

In the arithmetic processing offload system 1000, the client 100 offloads specific processing of the application to an accelerator 212 disposed in the server 200 to perform arithmetic processing.

[Client 100]
The client 100 includes client HW 110, an OS 120, and an APL 130.
<<Client HW 110>>
The client HW 110 includes an NIC 111.
The NIC 111 is NIC hardware that implements an NW interface.

In <Transmission pattern>, the NIC 111 receives, as an input, a "transmission packet" from a packet processing inline insertion unit 123 via an NIC driver unit 124. In <Transmission pattern>, the NIC 111 passes the "transmission packet" to an NIC 211 of the server 200 connected thereto via the NW 1 as an output.

In <Reception pattern>, the NIC 111 receives, as an input, the "received packet" from the NIC 211 of the server 200 connected thereto via the NW 1. In <Reception pattern>, the NIC 111 passes the "received packet" to the packet processing inline insertion unit 123 via the NIC driver unit 124 as an output.
<<OS 120>>
The OS 120 includes an L3/L4 protocol/ACC function/argument data packetizing unit (hereinafter referred to as an ACC function/argument data packetizing unit) 121, an L3/L4 protocol/ACC function/return value data parsing unit (hereinafter referred to as an ACC function/return value data parsing unit) 122, a packet processing inline insertion unit 123, and an NIC driver unit 124.

Here, an outline of the ACC function/argument data packetizing unit 121 and the ACC function/return value data parsing unit 122 will be first described (detailed description will be given later).

(1) The ACC function/argument data packetizing unit 121 combines the function/return value packetizing unit 45 on the APL 40 side and the L4/L3 protocol stack unit 31 of the OS 30 in the accelerator standard IF offload system of the related art illustrated in FIG. 13 to form a single dedicated function. As described in the existing technology illustrated in FIG. 5 below, the single dedicated function is obtained by integrating the protocol processing functions such as Soft IRQ handler processing/L2, L3 protocol processing 303, packet pruning processing (NAPI) 304, Soft IRQ handler processing/L4 protocol processing 305, and ACC function parsing processing 311 of the OS 30 illustrated in FIG. 5 into a single function, and is one of features of the present invention. In the related art, there are a plurality of protocol processing functions, but in the present embodiment, the ACC function/argument data packetizing unit 121 is integrated as a single dedicated function.

Similarly to the case of the ACC function/argument data packetizing unit 121, the ACC function/return value data parsing unit 122 also combines the function/argument data parsing unit 46 on the APL 40 side and the L4/L3 protocol stack unit 31 of the OS 30 in the accelerator standard IF offload system of the related art illustrated in FIG. 13 to form a single dedicated function.

In this way, in the related art, there are a plurality of pieces of protocol processing (L2, L3 protocol processing, packet pruning processing (NAPI), L4 protocol processing, ACC function parsing processing, and the like), and it is necessary to select a protocol stack such as L4/L3. On the other hand, the arithmetic processing offload system 1000 includes the ACC function/argument data packetizing unit 121 and the ACC function/return value data parsing unit 122 having a single dedicated function, and thus a plurality of pieces of protocol processing required in the related art are eliminated and dedicated. In the following description, "eliminating a process of selecting an L4/L3 protocol stack having a plurality of pieces of processing" is referred to as "data cooperation (first cooperation)".

Accordingly, since the arithmetic processing offload system 1000 reduces the number of times of selection and copying by data cooperation on the client 100 side, there is no overhead and the high speed can be achieved.

(2) The ACC function/argument data packetizing unit 121 and the ACC function/return value data parsing unit 122 are provided in the OS 120. In the accelerator standard IF offload system of the related art illustrated in FIG. 13, the function/return value packetizing unit 45 and the function/argument data parsing unit 46 are provided on the APL 40 side.

As described above, the ACC function/argument data packetizing unit 121 and the ACC function/return value data parsing unit 122 are configured by a single dedicated function and are deployed in the OS 120.

(3) First, an outline of the packet processing inline insertion unit 123 will be described (detailed description will be given later).

The packet processing inline insertion unit 123 exchanges data with the NIC driver unit 124 that prunes data from the NIC 111 without passing through an existing protocol stack. "Exchanging data without passing through an existing protocol stack" by the packet processing inline insertion unit 123 is referred to as "data cooperation (second cooperation)".

<ACC Function/Argument Data Packetizing Unit 121>

The ACC function/argument data packetizing unit 121 serializes the function name/argument input from the application side according to a format of a predetermined protocol and packetizes the function name/argument as a payload.

The ACC function/argument data packetizing unit 121 converts the input function name/argument into data as a UDP/IP packet and a payload thereof. The ACC function/argument data packetizing unit 121 serializes the input function name/plurality of arguments according to a predetermined format and converts the function name/plurality of arguments into single data.

Figure 2:
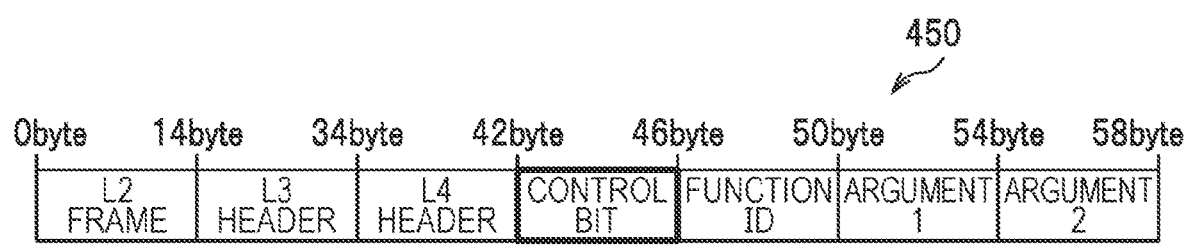
FIG. 2 is a diagram illustrating a configuration example of an ACC function/argument data packet of the arithmetic processing offload system according to the embodiment of the present invention.

FIG. 2 is a diagram illustrating a configuration example of an ACC function/argument data packet 450.

The ACC function/argument data packet 450 is formatted with an L2 frame (0 to 14 bytes), an L3 header (up to 34 bytes), an L4 header (up to 42 bytes), a control bit (up to 46 bytes), a function ID (up to 50 bytes), an argument 1 (up to 54 bytes), and an argument 2 (up to 58 bytes).

The control bits add control information to the packet. For example, in a case where the argument size is large, the ACC function/argument data packetizing unit 121 has a function of dividing into a plurality of packets. At this time, control data for notifying the "control bit" of the last packet is added to the last divided packet.

The packet format illustrated in FIG. 2 may include not only the function name/argument but also an ID that can uniquely identify the accelerator to be used.

Referring back to FIG. 1, the ACC function/argument data packetizing unit 121 receives a "function name/argument" from an ACC function proxy receiving unit 132 as an input. The ACC function/argument data packetizing unit 121 passes the "transmission packet" to the packet processing inline insertion unit 123 as an output.

Here, the L3/L4 protocol may be other than TCP/IP, for example, TCP/IP (Transmission Control Protocol/Internet Protocol) or L3/L4 may be partially omitted and only L3 may be used.

The packet format may include not only the function name/argument but also an ID that can uniquely identify the accelerator to be used.

In addition, in a case where the argument size is large, a function of dividing into a plurality of packets may be provided. At this time, control data for notifying the last packet illustrated in FIG. 2 is added to the last divided packet.

<ACC Function/Return Value Data Parsing Unit 122>

The ACC function/return value data parsing unit 122 deserializes the packet data input from the server 200 side according to a format of a predetermined protocol, and acquires a function name/execution result.

The ACC function/return value data parsing unit 122 acquires a "function name/execution result" from the input data by deserializing the input packet data, and passes the acquired function name/execution result to an ACC function proxy response unit 133.

Figure 3:
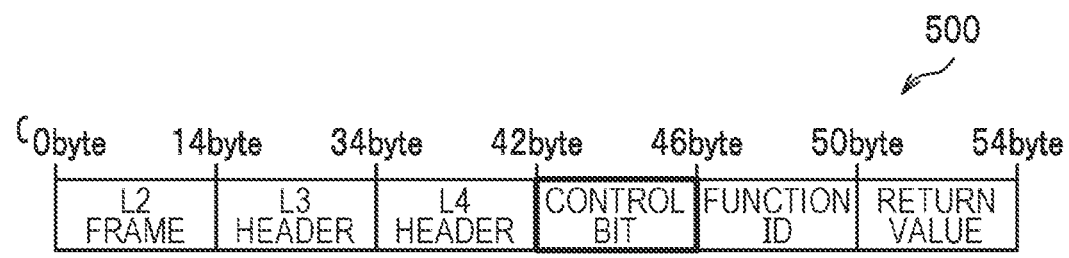
FIG. 3 is a diagram illustrating a configuration example of an accelerator function/return value packet of the arithmetic processing offload system according to the embodiment of the present invention.

FIG. 3 is a diagram illustrating a configuration example of an ACC function/return value packet 500.

The ACC function/return value packet 500 is a format of the parsing target data of the ACC function/return value data parsing unit 122.

The ACC function/return value packet 500 is formatted with an L2 frame (0 to 14 bytes), an L3 header (up to 34 bytes), an L4 header (up to 42 bytes), a control bit (up to 46 bytes), a function ID (up to 50 bytes), and a return value (up to 54 bytes).

The control bits add control information to the packet. For example, in a case where the argument size is large, the ACC function/return value data parsing unit 122 has a function of dividing into a plurality of packets. At this time, control data for notifying the "control bit" of the last packet is added to the last divided packet.

Referring back to FIG. 1, the ACC function/return value data parsing unit 122 receives the "received packet" from the packet processing inline insertion unit 123 as an input. The ACC function/return value data parsing unit 122 passes the "function name/execution result" to the ACC function proxy response unit 133 as an output.

The embodiment of the packet format conforms to the ACC function/return value packet 500 in FIG. 3.

Further, in a case where the ACC function/argument data packetizing unit 121 has a function of dividing into a plurality of packets, the ACC function/return value data parsing unit 122 also has combining processing.

<Packet Processing Inline Insertion Unit 123>

The packet processing inline insertion unit 123 has a transmission/reception function of exchanging input packet data ("transmission packet") with a device driver (NIC driver unit 124) without passing through an existing protocol stack. The packet processing inline insertion unit 123 corresponds to, for example, a high-speed communication mechanism with a driver such as XDP/eBPF of Linux (registered trademark).

The packet processing inline insertion unit 123 exchanges data with the ACC function/argument data packetizing unit 121, the ACC function/return value data parsing unit 122, and the NIC driver unit 124 that prunes data from the NIC 111 without passing through a predetermined protocol stack.

In <Transmission pattern>, the packet processing inline insertion unit 123 receives a "transmission packet" from the ACC function/argument data packetizing unit 121 as an input. In <Transmission pattern>, the packet processing inline insertion unit 123 passes the "transmission packet" to the NIC driver unit 124 as an output.

In <Reception pattern>, the packet processing inline insertion unit 123 receives the "received packet" from the NIC driver unit 124 as an input. In <Reception pattern>, the packet processing inline insertion unit 123 passes the "received packet" to the L3/L4 protocol/ACC function/return value data parsing unit 122 as an output.

<NIC Driver Unit 124>

The NIC driver unit 124 is a device driver that abstracts an interface specific to each NIC type. The NIC driver unit 124 is configured by a normal commercial device driver.

In <Transmission pattern>, the NIC driver unit 124 receives a "transmission packet" from the packet processing inline insertion unit 123 as an input. In <Transmission pattern>, the NIC driver unit 124 passes the "transmission packet" to the NIC 111 as an output.

In <Reception pattern>, the NIC driver unit 124 receives the "received packet" from the NIC 111 as an input. In <Reception pattern>, the NIC driver unit 124 passes the "received packet" to the packet processing inline insertion unit 123 as an output.

<<APL 130>>

The APL 130 includes a user application unit 131, an ACC function proxy receiving unit 132, and an ACC function proxy response unit 133.

<User Application Unit 131>

The user application unit 131 is a program executed in a user space. The user application unit 131 is constructed on the premise of use of a defined API such as OpenCL, and has inputs and outputs with these APIs. The user application unit 131 has a "function name/argument" for the ACC function proxy receiving unit 132 as an output. The user application unit 131 receives the function execution result from the ACC function proxy response unit 133 as an input.

The user application unit 131 may have a result output destination such as image drawing on a display as another output destination.

<ACC Function Proxy Receiving Unit 132>

The ACC function proxy receiving unit 132 is implemented as middleware having an IF compatible with the defined API. The ACC function proxy receiving unit 132 has an IF equivalent to a defined API such as OpenCL and receives an API call from the user. The ACC function proxy receiving unit 132 is prepared as a binary file different from the user application unit 131, and is implemented in a "dynamic library format" in which dynamic link and call are performed at the time of execution.

The ACC function proxy receiving unit 132 receives a "function name/argument" from the user application unit 131 as an input. The ACC function proxy receiving unit 132 passes the "function name/argument" to the ACC function/argument data packetizing unit 121 as an output.

The ACC function proxy receiving unit 132 may be in a "static library format" that is linked to the user application at the time of program generation and executed integrally.

<ACC Function Proxy Response Unit 133>

The ACC function proxy response unit 133 is implemented as middleware having an IF compatible with the defined API. The ACC function proxy response unit 133 is prepared as a binary file different from the user application unit 131, and is implemented in a "dynamic library format" in which dynamic link and call are performed at the time of execution.

The ACC function proxy response unit 133 exchanges data with the ACC function/return value data parsing unit 122, the ACC function/argument data packetizing unit 121, and the NIC driver unit 124 that prunes data from the NIC 111 without passing through a predetermined protocol stack.

The ACC function proxy response unit 133 receives the "function name/execution result" from the ACC function/return value data parsing unit 122 as an input. The ACC function proxy response unit 133 passes the "return value" (response data) to the user application unit 131 as an output.

The ACC function proxy response unit 133 may be in a "static library format" that is linked to the user application at the time of program generation and executed integrally.

[Server 200]

The server 200 includes a server HW 210, an OS 220, and an APL 230.

<<Server HW 210>>

The server HW 210 includes an NIC 211 and an accelerator 212.

<NIC 211>

The NIC 211 is NIC hardware that implements an NW interface.

In <Transmission pattern>, the NIC 211 receives a "transmission packet" from a packet processing inline insertion unit 223 as an input. In <Transmission pattern>, the NIC 211 passes the "transmission packet" to the NIC 111 of the client 100 connected thereto via the NW 1 as an output.

In <Reception pattern>, the NIC 211 receives, as an input, the "received packet" from the NIC 111 of the client 100 connected thereto via the NW 1. In <Reception pattern>, the NIC 211 passes the "received packet" to the packet processing inline insertion unit 223 via an NIC driver unit 224 as an output.

<Accelerator 212>

The accelerator 212 is computing unit hardware that performs a specific operation at high speed based on an input from the CPU. The accelerator 212 corresponds to a GPU/FPGA connected to the server 200.

In <Transmission pattern>, the accelerator 212 receives "ACC instruction data" from an ACC function proxy execution unit 231 as an input. In <Transmission pattern>, the accelerator 212 passes the "execution result" to the ACC function proxy execution unit 231 as an output.

The accelerator 212 may be an integrated CPU and accelerator as one chip, such as a system on chip (SoC).

In a case where the accelerator 212 is not mounted, the ACC function proxy execution unit 231 may not be provided.

<<OS 220>>

The OS 220 includes an L3/L4 protocol/ACC function/return value data packetizing unit (hereinafter referred to as an ACC function/return value data packetizing unit) 221, an L3/L4 protocol/ACC function/argument data parsing unit (hereinafter referred to as an ACC function/argument data parsing unit) 222, a packet processing inline insertion unit 223, and an NIC driver unit 224.

The OS 220 of the server 200 also has the following features similarly to the OS 120 of the client 100 described above.

(1) The ACC function/return value data packetizing unit 221 combines the function/return value packetizing unit 84 on the APL 80 side and the L4/L3 protocol stack unit 71 of the OS 70 in the accelerator standard IF offload system of the related art illustrated in FIG. 13 to form a single dedicated function. Similarly, the ACC function/argument data parsing unit 222 combines the function/argument data parsing unit 82 on the APL 80 side and the L4/L3 protocol stack unit 71 of the OS 70 in the accelerator standard IF offload system of the related art illustrated in FIG. 13 to form a single dedicated function.

Accordingly, since the arithmetic processing offload system 1000 reduces the number of times of selection and copying by data cooperation on the server 200 side, there is no overhead and the high speed can be achieved.

(2) The ACC function/return value data packetizing unit 221 and the ACC function/argument data parsing unit 222 are provided on the OS 220 side.

In this way, the ACC function/return value data packetizing unit 221 and the ACC function/argument data parsing unit 222 on the server 200 side are configured as a single dedicated function similarly to the ACC function/argument data packetizing unit 121 and the ACC function/return value data parsing unit 122 on the client 100 side, and thus the function deployment is changed to the OS 220 side.

(3) The packet processing inline insertion unit 223 exchanges data with the NIC driver unit 224 without passing through an existing protocol stack ("data cooperation (second cooperation)"), similarly to the packet processing inline insertion unit 123 on the client 100 side.

<ACC Function/Return Value Data Packetizing Unit 221>

The ACC function/return value data packetizing unit 221 serializes the function name/argument input from the accelerator 212 according to a format of a predetermined protocol and packetizes the function name/argument as a payload.

The ACC function/return value data packetizing unit 221 has a function of converting an input function name/function execution result into data as a UDP/IP packet and a payload thereof.

The ACC function/return value data packetizing unit 221 serializes the input function name/function execution result according to a predetermined format and converts the function name/function execution result into single data.

The ACC function/return value data packetizing unit 221 receives the "function name/argument" from the accelerator 212 as an input. The ACC function/return value data packetizing unit 221 passes the "transmission packet" to the packet processing inline insertion unit 223 as an output.

Similarly to the ACC function/argument data packetizing unit 121, the L3/L4 protocol of the ACC function/return value data packetizing unit 221 may be TCP/IP, SCTP (Stream Control Transmission Protocol)/IP, or the like other than UDP (User Datagram Protocol)/IP. In addition, a configuration may be employed in which only L3 is used instead of both L3/L4. Specifically, a configuration is conceivable in which IP is used for L3 and a dedicated protocol defined by the user is used for L4 or more.

In addition, only the L4 protocol may be integrated with the ACC function/return value data packetizing unit 221, and the L3 protocol may use a general-purpose protocol stack of the OS.

In addition, in a case where the argument size is large, a function of dividing into a plurality of packets may be provided. At this time, control data for notifying the last packet is added to the last divided packet (see FIG. 3).

<ACC Function/Argument Data Parsing Unit 222>

The ACC function/argument data parsing unit 222 deserializes the packet data input from the client 100 side according to a format of a predetermined protocol, and acquires a function name/plurality of arguments.

The ACC function/argument data parsing unit 222 acquires a function name/plurality of arguments from the input data by deserializing the input packet data, and passes the function name/plurality of arguments to the ACC function proxy execution unit 231.

The format of the parsing target data of the ACC function/argument data parsing unit 222 is illustrated in FIG. 2.

The ACC function/argument data parsing unit 222 receives the "received packet" from the packet processing inline insertion unit 223 as an input. The ACC function/argument data parsing unit 222 passes "function name/argument data" to the ACC function proxy execution unit 231 as an output.

An example of the packet format of the ACC function/argument data parsing unit 222 conforms to the ACC function/argument data packetizing unit 121. Furthermore, in a case where the ACC function/argument data packetizing unit 121 has a function of dividing into a plurality of packets, the ACC function/argument data parsing unit 222 also has combining processing.

<Packet Processing Inline Insertion Unit 223>

The packet processing inline insertion unit 223 has a transmission/reception function of exchanging input packet data with a device driver without passing through an existing protocol stack. The packet processing inline insertion unit 223 corresponds to, for example, a high-speed communication mechanism with a driver such as XDP/eBPF of Linux (registered trademark).

In <Transmission pattern>, the packet processing inline insertion unit 223 receives a "transmission packet" from the ACC function/return value data packetizing unit 221 as an input. In <Transmission pattern>, the packet processing inline insertion unit 223 passes the "transmission packet" to the NIC driver unit 224 as an output.

In <Reception pattern>, the packet processing inline insertion unit 223 receives the "received packet" from the NIC driver unit 224 as an input. In <Reception pattern>, the packet processing inline insertion unit 223 passes the "received packet" to the ACC function/argument data parsing unit 222 as an output.

<NIC Driver Unit 224>

The NIC driver unit 224 is a device driver that abstracts an interface specific to each NIC type. The NIC driver unit 224 is configured by a normal commercial device driver.

In <Transmission pattern>, the NIC driver unit 224 receives a "transmission packet" from the packet processing inline insertion unit 223 as an input. In <Transmission pattern>, the NIC driver unit 224 passes the "transmission packet" to the NIC 211 as an output.

In <Reception pattern>, the NIC driver unit 224 receives the "received packet" from the NIC 211 as an input. In <Reception pattern>, the NIC driver unit 224 passes the "received packet" to the packet processing inline insertion unit 223 as an output.

<<APL 230>>

The APL 230 includes an ACC function proxy execution unit 231.

The ACC function proxy execution unit 231 executes the ACC function based on the input function name/argument, and cooperates the result with the accelerator 212. The ACC function proxy execution unit 231 assumes, for example, an OpenCL runtime or a CUDA runtime which is an existing accelerator-use runtime.

In <Execution time pattern>, the ACC function proxy execution unit 231 receives a "function name/argument" from the ACC function/argument data parsing unit 222 as an input. In <Execution time pattern>, the ACC function proxy execution unit 231 passes the "ACC instruction data" to the accelerator 212 as an output.

In <Result response time pattern>, the ACC function proxy execution unit 231 receives the "execution result" from the accelerator 212 as an input. In <Result response time pattern>, the ACC function proxy execution unit 231 passes the "function name/function execution result" to the ACC function/return value data packetizing unit 221 as an output.

Note that the function may be executed without the accelerator 212. Specifically, an RPC server or the like corresponds thereto. In this case, cooperation with the accelerator 212 is not performed, and a result of operation performed by the CPU is responded.

In this way, the arithmetic processing offload system 1000 according to the present embodiment implements the "L3/L4 protocol stack" and the "ACC function/argument data" as a single dedicated function (that is, ACC function/argument data packetizing unit 121, ACC function/return value data parsing unit 122, ACC function/return value data packetizing unit 221, and ACC function/argument data parsing unit 222) for each of the "parsing function" and the "packet generation function" as functions inside the OSs. In the existing technology illustrated in FIG. 13, only general-purpose and common functions are provided in the OS, but in the present embodiment, the dedicated functions are deployed inside the OSs 120 and 220.

Figure 4:
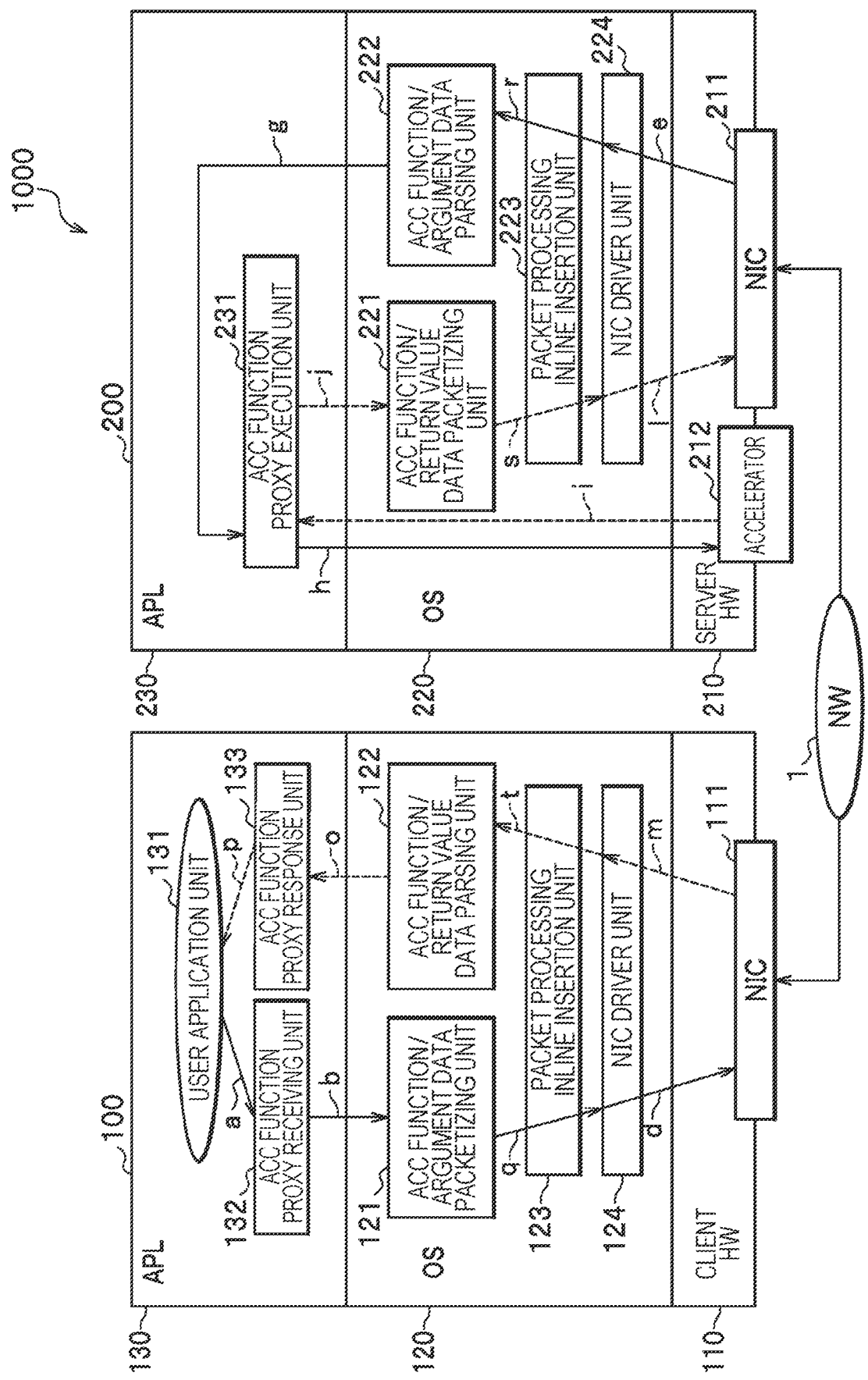
FIG. 4 is a diagram illustrating an offload processing flow of the arithmetic processing offload system according to the embodiment of the present invention.

Specifically, in FIGS. 1 and 4, in the arithmetic processing offload system 1000, the OS 120 of the client 100 includes the ACC function/argument data packetizing unit 121, the ACC function/return value data parsing unit 122, and the packet processing inline insertion unit 123, and the OS 220 of the server 200 includes the ACC function/return value data packetizing unit 221, the ACC function/argument data parsing unit 222, and the packet processing inline insertion unit 223.

Since the OSs 120 and 220 have dedicated functions (ACC function/argument data packetizing unit 121, ACC function/return value data parsing unit 122, ACC function/return value data packetizing unit 221, and ACC function/argument data parsing unit 222), there is no overhead (described in comparison with FIGS. 5 and 6) due to data cooperation between the APL and the OS.

Further, since the dedicated functions (ACC function/argument data packetizing unit 121, ACC function/return value data parsing unit 122, ACC function/return value data packetizing unit 221, and ACC function/argument data parsing unit 222) are cooperated with the NIC driver units 124 and 224 by the packet processing inline insertion units 123 and 223, there is no overhead between the NIC driver units 124 and 224 and the dedicated functions (ACC function/argument data packetizing unit 121, ACC function/return value data parsing unit 122, ACC function/return value data packetizing unit 221, and ACC function/argument data parsing unit 222).

Since the above is implemented by software inside the OS, it can be implemented without special function deployment to the NICs 111 and 211.

An operation of the arithmetic processing offload system 1000 configured as described above will be described below.

[Outline of Operation of Arithmetic Processing Offload System 1000]

FIG. 4 is a diagram illustrating an offload processing flow of the arithmetic processing offload system 1000 of FIG. 1. In the description of FIG. 4, the same offload processing flow as that in FIG. 13 is denoted by the same reference numeral.

A solid line arrow in FIG. 4 indicates an offload forward path, and a broken line arrow in FIG. 4 indicates an offload return path.

Offload Forward Path

As illustrated in FIG. 4, the ACC function proxy receiving unit 132 of the APL 130 of the client 100 receives a "function name/argument" from the user application unit 131 as an input (see reference numeral a in FIG. 4). The ACC function proxy receiving unit 132 of the client 100 passes the "function name/argument" to the ACC function/argument data packetizing unit 121 of the OS 120 as an output (see reference numeral b in FIG. 4).

The ACC function/argument data packetizing unit 121 of the OS 120 receives the "function name/argument" from the ACC function proxy receiving unit 132 as an input (see reference numeral b in FIG. 4). The ACC function/argument data packetizing unit 121 converts the input function name/argument into data as a UDP/IP packet and a payload thereof. The ACC function/argument data packetizing unit 121 serializes the input function name/plurality of arguments according to a predetermined format and converts the function name/plurality of arguments into single data. The ACC function/argument data packetizing unit 121 passes the "transmission packet" to the packet processing inline insertion unit 123 as an output (see reference numeral q in FIG. 4).

In <Transmission pattern>, the packet processing inline insertion unit 123 of the OS 120 receives the "transmission packet" from the ACC function/argument data packetizing unit 121 as an input. The packet processing inline insertion unit 123 exchanges the input packet data with a device driver without passing through an existing protocol stack. In <Transmission pattern>, the packet processing inline insertion unit 123 passes the "transmission packet" to the NIC driver unit 124 as an output (see reference numeral q in FIG. 4).

In <Transmission pattern>, the NIC driver unit 124 of the OS 120 receives the "transmission packet" from the packet processing inline insertion unit 123 as an input (see reference numeral q in FIG. 4). The NIC driver unit 124 abstracts an interface specific to each NIC type. In <Transmission pattern>, the NIC driver unit 124 passes the "transmission packet" to the NIC 111 as an output (see reference numeral d in FIG. 4).

The NIC 111 transmits the packet to the NIC 211 of the server 200 connected thereto via the NW 1.

The NIC driver unit 224 of the server 200 receives the packet from the NIC 211 (see reference numeral e in FIG. 4) and passes the packet to the packet processing inline insertion unit 223.

In <Reception pattern>, the packet processing inline insertion unit 223 receives the "received packet" from the NIC driver unit 224 as an input. The packet processing inline insertion unit 223 exchanges the input packet data with a device driver without passing through an existing protocol stack. In <Reception pattern>, the packet processing inline insertion unit 223 passes the "received packet" to the ACC function/argument data parsing unit 222 as an output (see reference numeral r in FIG. 4).

The ACC function/argument data parsing unit 222 of the OS 220 of the server 200 receives the "received packet" from the packet processing inline insertion unit 223 as an input. The ACC function/argument data parsing unit 222 acquires a function name/plurality of arguments from the input data by deserializing the input packet data. The ACC function/argument data parsing unit 222 passes the "function name/argument data" to the ACC function proxy execution unit 231 as an output (see reference numeral g in FIG. 4).

In <Execution time pattern>, the ACC function proxy execution unit 231 of the APL 230 of the server 200 receives a "function name/argument" from the ACC function/argument data parsing unit 222 as an input. The ACC function proxy execution unit 231 executes the ACC function based on the input function name/argument, and cooperates the result with the accelerator 212. In <Execution time pattern>, the ACC function proxy execution unit 231 passes the "ACC instruction data" to the accelerator 212 as an output (see reference numeral h in FIG. 4).

The accelerator 212 of the server HW 210 of the server 200 receives "ACC instruction data" from the ACC function proxy execution unit 231 as an input. The accelerator 212 performs a specific operation at high speed based on an input from the CPU.

Offload Return Path

In <Transmission pattern>, the accelerator 212 passes the "execution result" to the ACC function proxy execution unit 231 (see reference numeral i in FIG. 4).

In <Result response time pattern>, the ACC function proxy execution unit 231 receives the "execution result" from the accelerator 212 as an input (see reference numeral i in FIG. 4). The ACC function proxy execution unit 231 executes the ACC function based on the input function name/argument, and cooperates the result with the accelerator 212. In <Result response time pattern>, the ACC function proxy execution unit 231 passes the "function name/function execution result" to the ACC function/return value data packetizing unit 221 as an output (see reference numeral j in FIG. 4).

The ACC function/return value data packetizing unit 221 receives the "function name/argument" from the ACC function proxy execution unit 231 as an input (see reference numeral j in FIG. 4). The ACC function/return value data packetizing unit 221 converts the input function name/function execution result into data as a UDP/IP packet and a payload thereof. The ACC function/return value data packetizing unit 221 passes the "transmission packet" to the packet processing inline insertion unit 223 as an output (see reference numeral s in FIG. 4).

In <Transmission pattern>, the packet processing inline insertion unit 223 receives the "transmission packet" from the ACC function/return value data packetizing unit 221 as an input (see reference numeral s in FIG. 4). The packet processing inline insertion unit 223 exchanges the input packet data with a device driver without passing through an existing protocol stack. In <Transmission pattern>, the packet processing inline insertion unit 223 passes the "transmission packet" to the NIC driver unit 224 as an output (see reference numeral s in FIG. 4).

In <Transmission pattern>, the NIC driver unit 224 receives the "transmission packet" from the packet processing inline insertion unit 223 as an input (see reference numeral l in FIG. 4). In <Transmission pattern>, the NIC driver unit 224 passes the "transmission packet" to the NIC 211 as an output (see reference numeral l in FIG. 4).

The NIC 211 transmits the packet to the NIC 111 of the client 100 connected thereto via the NW 1.

The NIC driver unit 124 of the client 100 receives the packet from the NIC 111 and passes the packet to the packet processing inline insertion unit 123 (see reference numeral m in FIG. 13).

In <Reception pattern>, the packet processing inline insertion unit 123 receives the "received packet" from the NIC driver unit 124 as an input (see reference numeral m in FIG. 4). The packet processing inline insertion unit 123 exchanges the input packet data with a device driver without passing through an existing protocol stack. In <Reception pattern>, the packet processing inline insertion unit 123 passes the "received packet" to the L3/L4 protocol/ACC function/return value data parsing unit 122 as an output (see reference numeral t in FIG. 4).

The ACC function/return value data parsing unit 122 acquires a function name/execution result from the input data by deserializing the input packet data, and passes the acquired function name/execution result to the ACC function proxy response unit 133 (see reference numeral o in FIG. 4).

The ACC function proxy response unit 133 receives the "function name/execution result" from the ACC function/return value data parsing unit 122 as an input (see reference numeral o in FIG. 4). The ACC function proxy response unit 133 executes an ACC function proxy response by middleware having an IF compatible with the defined API. The ACC function proxy response unit 133 passes the "return value" to the user application unit 131 as an output (see reference numeral p in FIG. 4).

The user application unit 131 receives the function execution result from the ACC function proxy response unit 133.

In the arithmetic processing offload system 1000 of the present embodiment, the OSs 120 and 220 deploy the "L3/L4 protocol stack" and the "ACC function/argument data" as dedicated functions (ACC function/argument data packetizing unit 121, ACC function/return value data parsing unit 122, ACC function/return value data packetizing unit 221, and ACC function/argument data parsing unit 222) for each of the "parsing function" and the "packet generation function" as functions inside the OSs.

Accordingly, since the dedicated functions operate as functions inside the OSs, there is no overhead (described in comparison with FIGS. 5 and 6 to be described later) due to data cooperation between the APL and the OS.

Further, the dedicated functions are cooperated with the NIC driver units 124 and 224 by the packet processing inline insertion units 123 and 223. Accordingly, since the dedicated functions are cooperated with the NIC driver units 124 and 224 by the packet processing inline insertion units 123 and 223 (see reference numerals q, t, s, and r in FIG. 4), there is no overhead between the NIC driver units 124 and 224 and the dedicated functions.

Next, overhead due to data cooperation between the APL and the OS will be described.

[Overhead Due to Data Cooperation Between APL and OS]

Figure 5:
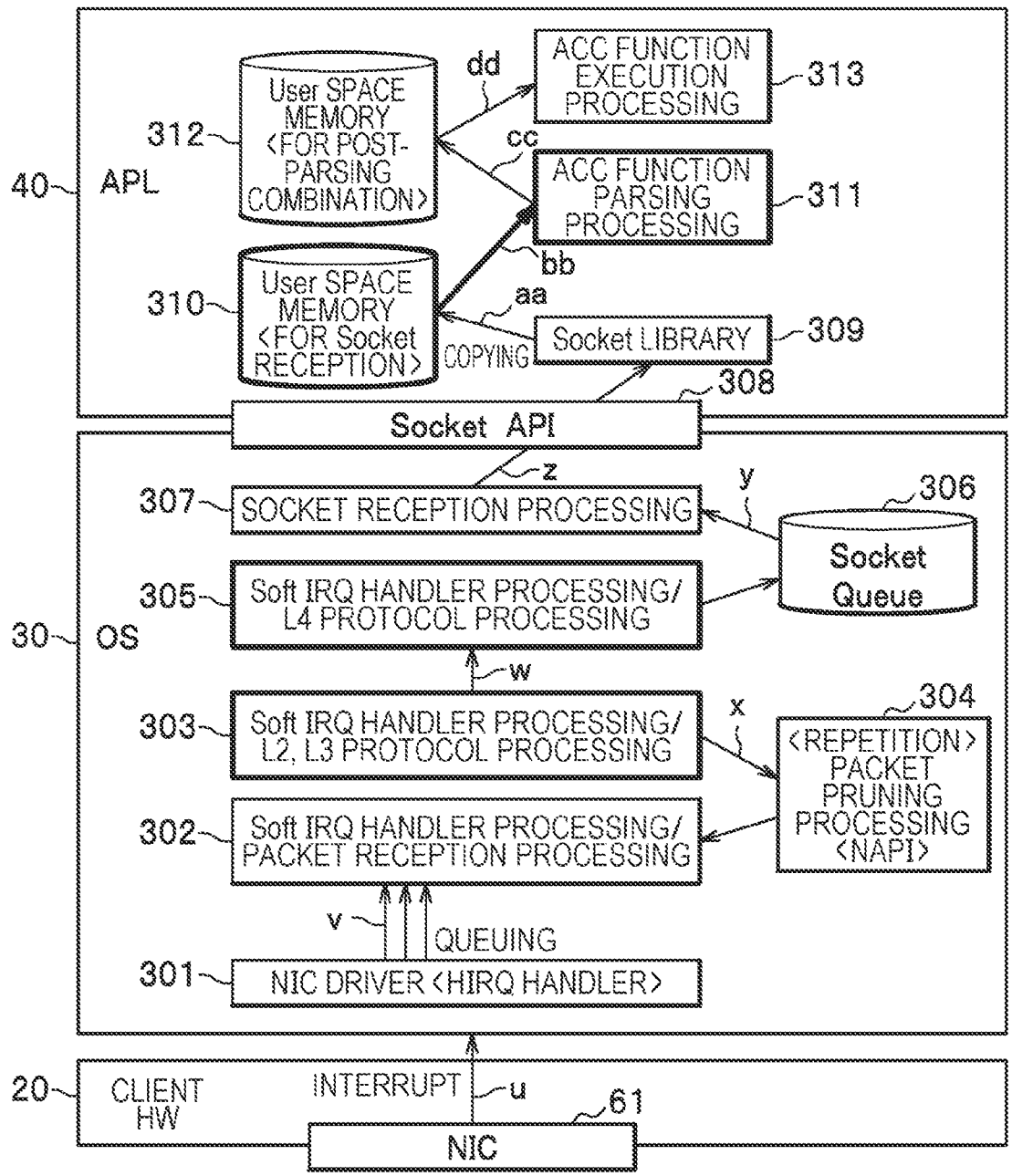
FIG. 5 is a diagram illustrating an outline of middleware processing in a reception unit of a client of an existing technology.
Figure 6:
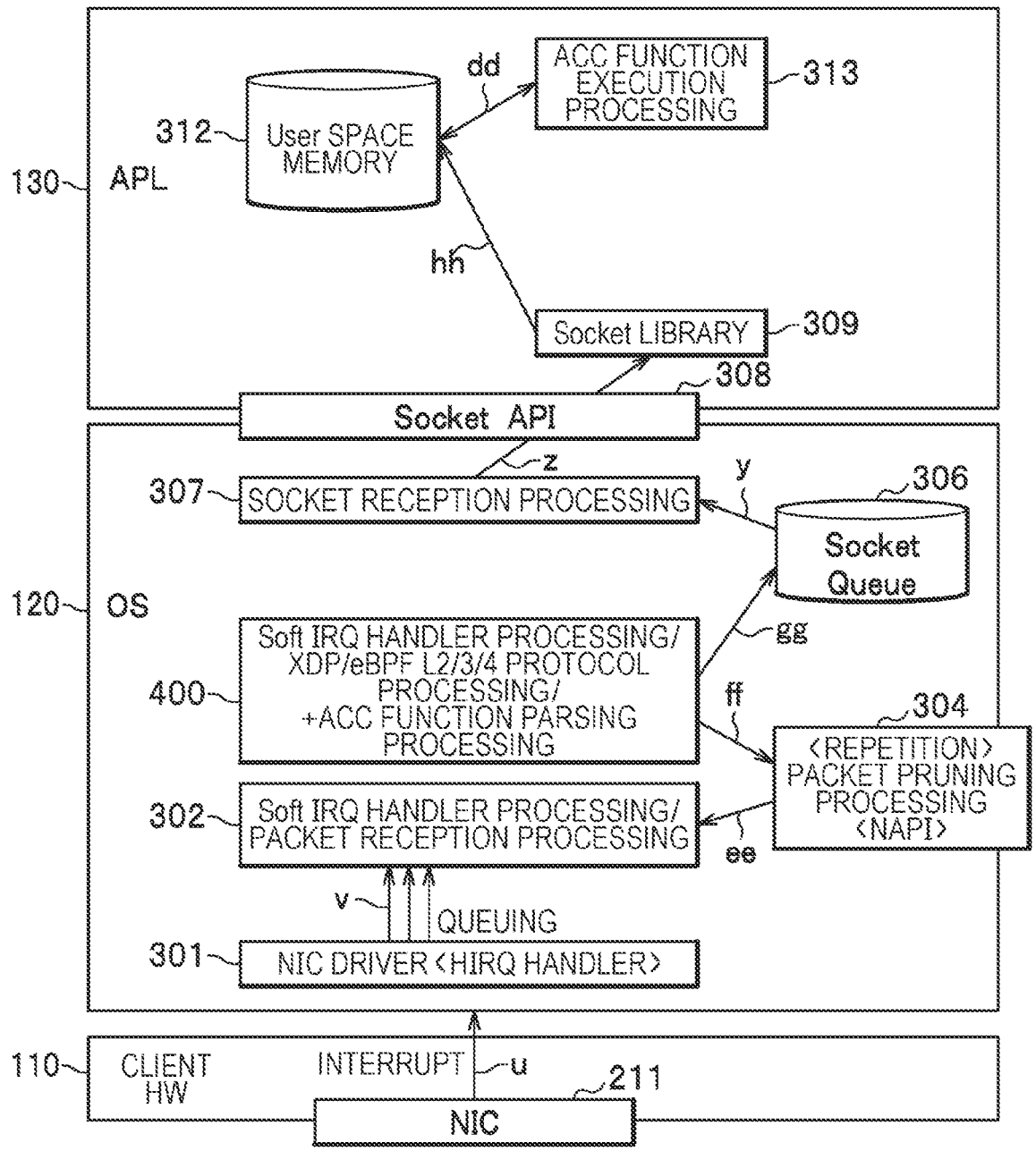
FIG. 6 is a diagram illustrating an outline of Socket-based remote ACC usage middleware processing constructed on an XDP/eBPF base of the arithmetic processing offload system according to the embodiment of the present invention.

FIGS. 5 and 6 are diagrams illustrating overhead due to data cooperation between the APL and the OS.

<<Middleware Processing of Existing Technology>>

FIG. 5 is a diagram illustrating an outline of middleware processing in a reception unit of a client of an existing technology. The middleware processing uses Socket-based remote ACC usage middleware processing as an example. For example, rCUDA (Remote Compute Unified Device Architecture) can be used as Socket-based remote ACC usage middleware.

<OS 30>

As illustrated in FIG. 5, in the OS 30, there is disposed an NIC driver (HIRQ handler) 301 which is a handler that is called by occurrence of a processing request of an NIC 61 (physical NIC) which is a network interface card (see reference numeral u in FIG. 5) and performs requested processing (hardware interrupt).

In the OS 30, there are disposed Soft IRQ handler processing/packet reception processing 302 which is a handler that is called by occurrence of a processing request of the NIC driver (HIRQ handler) 301 (queuing) (see reference numeral v in FIG. 5) and performs requested packet reception processing (software interrupt), Soft IRQ handler processing/L2, L3 protocol processing 303 which is a handler that receives the packet reception processing and performs L2, L3 protocol processing (software interrupt), and packet pruning processing (NAPI) 304 that repeats the Soft IRQ handler processing/L2, L3 protocol processing 303 (see reference numeral x in FIG. 5) and performs packet pruning processing (NAPI). Incidentally, pruning a queue is to delete an entry of a corresponding queue from the buffer with reference to the contents of packets accumulated in the buffer in consideration of processing to be performed next on the packet.

In the OS 30, there are disposed Soft IRQ handler processing/L4 protocol processing 305 which is a handler that receives the Soft IRQ handler processing/L2, L3 protocol processing 303 (see reference numeral w in FIG. 5) and performs Soft IRQ handler processing/L4 protocol processing (software interrupt), a Socket Queue 306 that stores queues generated by Soft IRQ handler processing/L4 protocol processing 305, and socket reception processing 307 that performs socket reception processing based on queues read from the Socket Queue 306 (see reference numeral y in FIG. 5). In addition, a Socket API 308 is disposed outside kernel of the OS 30.

<APL 40>

In the APL 40, there are disposed a Socket library 309 that stores an output of the socket reception processing 307 sent via the Socket API 308 (see reference numeral z in FIG. 5), a User space memory 310 for Socket reception that copies data of the Socket library 309 (see reference numeral aa in FIG. 5) and temporarily stores the data, ACC function parsing processing 311 that receives the data stored in the User space memory 310 (see reference numeral bb in FIG. 5) and performs ACC function parsing processing, a User space memory 312 for post-parsing combination of results of the ACC function parsing processing 311 (see reference numeral cc in FIG. 5), and ACC function execution processing 313 that performs ACC function processing based on data combined after parsing from the User space memory 312 (see reference numeral dd in FIG. 5).

In the Socket-based remote ACC usage middleware processing of the existing technology illustrated in FIG. 5, overheads (overhead caused by a process of selecting an L4/L3 protocol stack having a plurality of pieces of processing and overhead caused by data exchange by an NIC driver unit via an existing protocol stack) occur in the Soft IRQ handler processing/L2, L3 protocol processing 303, the Soft IRQ handler processing/L4 protocol processing 305 of the OS 30, and the User space memory 310 for Socket reception and the ACC function parsing processing 311 that performs the ACC function parsing processing of the APL 40, which are indicated by the thick solid line blocks in FIG. 5.

<<Middleware Processing of Arithmetic Processing Offload System 1000>>

FIG. 6 is a diagram illustrating an outline of Socket-based remote ACC usage middleware processing constructed on an XDP/eBPF base in the arithmetic processing offload system 1000 of the present embodiment. In the description of FIG. 6, the same processes as those in FIG. 5 are denoted by the same reference numerals, and the description of overlapping portions will be omitted.

<OS 120>

As illustrated in FIG. 6, in the OS 120, Soft IRQ handler processing/XDP/eBPF L2/L3/L4 protocol processing/ACC function parsing processing 400 is disposed instead of the Soft IRQ handler processing/L2, L3 protocol processing 303 and the Soft IRQ handler processing/L4 protocol processing 305 in FIG. 5. The Soft IRQ handler processing/XDP/eBPF L2/L3/L4 protocol processing/ACC function parsing processing 400 is a single dedicated function of processing the "L3/L4 protocol stack" and the "ACC function/argument data" for each of the "parsing function" and the "packet generation function" as a function inside the OS.

Furthermore, there is disposed packet pruning processing (NAPI) 304 that repeats the Soft IRQ handler processing/XDP/eBPF L2/L3/L4 protocol processing/ACC function parsing processing 400 (see reference numeral ff in FIG. 6), performs packet pruning processing (NAPI), and passes data of the processing result to the Soft IRQ handler processing/packet reception processing 302 (see reference numeral ee in FIG. 6).

In the Soft IRQ handler processing/XDP/eBPF L2/L3/L4 protocol processing/ACC function parsing processing 400, the "L3/L4 protocol stack" and the "ACC function/argument data" are collectively processed and passed to the Socket Queue 306 (see reference numeral gg in FIG. 6) for each of the "parsing function" and the "packet generation function".

Accordingly, in the OS 120, in the Soft IRQ handler processing/XDP/eBPF L2/L3/L4 protocol processing/ACC function parsing processing 400, the respective Soft IRQ handler processing, XDP/eBPF L2/L3/L4 protocol processing, and ACC function parsing processing are collectively performed as single processing. Therefore, the arithmetic processing offload system 1000 has no overhead due to data cooperation between the APL and the OS. More specifically, the arithmetic processing offload system 1000 has no overhead caused by a process of selecting an L4/L3 protocol stack having a plurality of pieces of processing and no overhead caused by data exchange by the NIC driver unit via an existing protocol stack.

In addition, the Soft IRQ handler processing/XDP/eBPF L2/L3/L4 protocol processing/ACC function parsing processing 400 is implemented by software inside the OS, and thus can be implemented without special function deployment to the NICs 111 and 211 (see FIGS. 1 and 4).

<APL 130>

In the APL 130, the User space memory 310 for Socket reception and the ACC function parsing processing 311 that performs the ACC function parsing processing of the APL 40 in FIG. 5 are deleted. The processing of copying the data of the Socket library 309 of FIG. 5 to the User space memory 310 for Socket reception and the ACC function parsing processing by the ACC function parsing processing 311 are omitted, and there is disposed the ACC function execution processing 313 that performs the ACC function processing based on the data of the Socket library 309 directly passed to the User space memory 312 for post-parsing combination (see reference numeral hh of FIG. 6).

Accordingly, the overhead (overhead caused by data copy) generated between the User space memory 310 for Socket reception of the APL 40 in FIG. 5 and the ACC function parsing processing 311 that performs the ACC function parsing processing is not generated in the arithmetic processing offload system 1000.

[Offload Processing of Arithmetic Processing Offload System 1000]

Next, offload processing of the arithmetic processing offload system 1000 will be described with reference to a control sequence of FIG. 7 and flowcharts of FIGS. 8 to 10.

Figure 7:
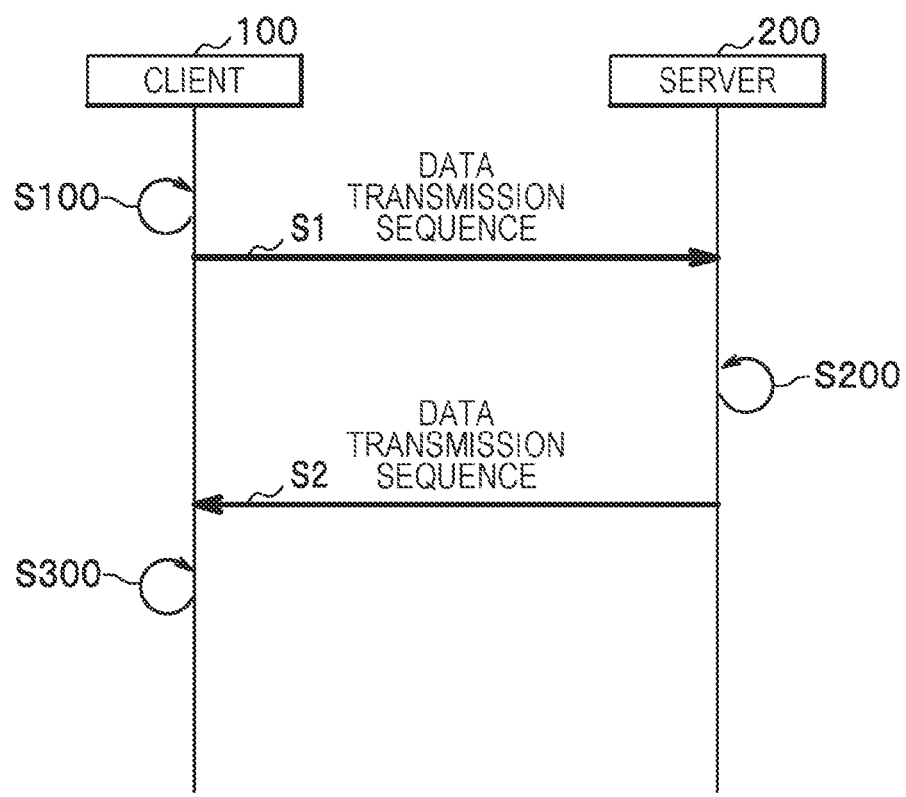
FIG. 7 is a control sequence illustrating offload processing of the arithmetic processing offload system according to the embodiment of the present invention.

FIG. 7 is a control sequence illustrating offload processing of the arithmetic processing offload system 1000 in FIG. 1.

As illustrated in FIG. 7, the client 100 (see FIGS. 1 and 4) performs offload processing at the time of transmission (S100; see FIG. 8), and transmits data of the processing result to the server 200 (see FIGS. 1 and 4) via the NW 1 (see FIGS. 1 and 4) (S1; see data transmission sequence).

The server 200 receives the data transmitted from the client 100 via the NW 1, and performs offload processing (S200; see FIG. 9) in the server.

The server 200 transmits data of the ACC function processing result to the client 100 via the NW 1 (S2; data transmission sequence).

Figure 10:
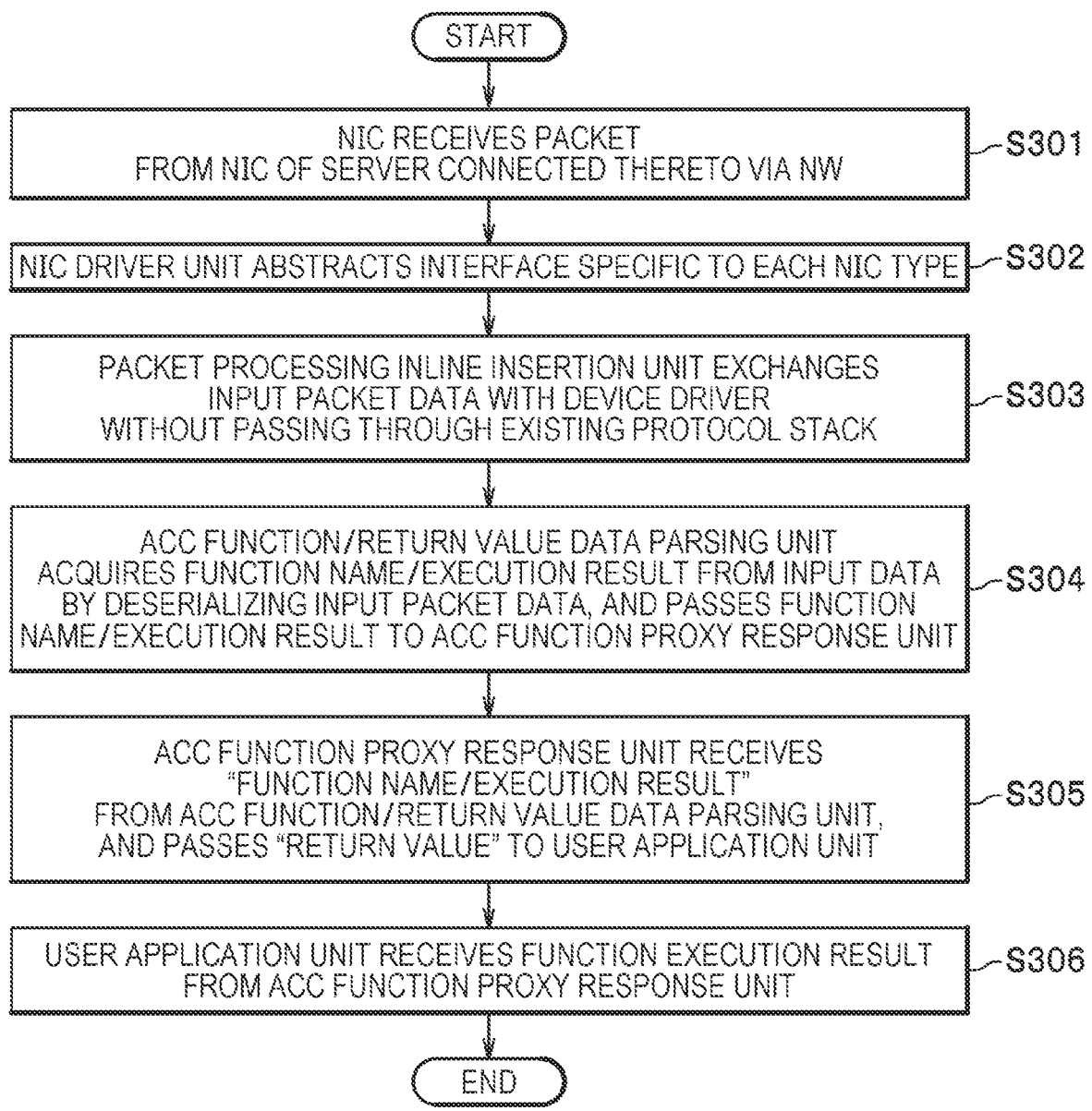
FIG. 10 is a flowchart illustrating offload processing at the time of reception by the client of the arithmetic processing offload system according to the embodiment of the present invention.

The client 100 performs offload processing at the time of reception (S300; see FIG. 10).

Figure 8:
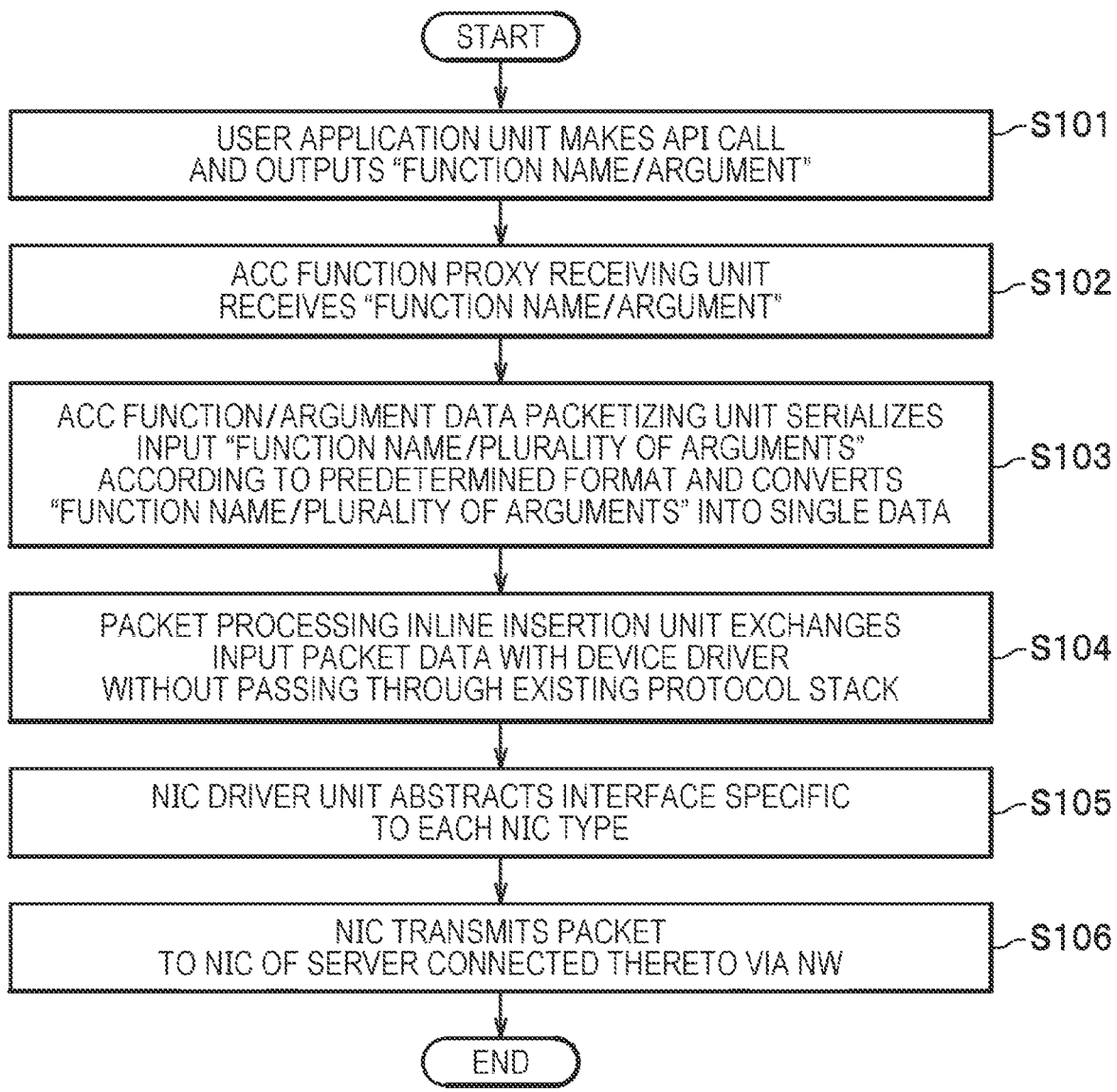
FIG. 8 is a flowchart illustrating offload processing at the time of transmission by a client of the arithmetic processing offload system according to the embodiment of the present invention.

FIG. 8 is a flowchart illustrating offload processing at the time of transmission (processing of S100 in FIG. 7) by the client 100 of the arithmetic processing offload system 1000 in FIG. 1.

In step S101, the user application unit 131 makes an API call and outputs a "function name/argument".

In step S102, the ACC function proxy receiving unit 132 receives the "function name/argument" from the user application unit 131, and passes the "function name/argument" to the ACC function/argument data packetizing unit 121.

In step S103, the ACC function/argument data packetizing unit 121 serializes the input "function name/plurality of arguments" according to a predetermined format, converts the function name/plurality of arguments into single data, and outputs the single data as a "transmission packet".

In step S104, the packet processing inline insertion unit 123 exchanges the input packet data ("transmission packet") with the device driver (NIC driver unit 124) without passing through the existing protocol stack.

In step S105, the NIC driver unit 124 receives the "transmission packet" from the packet processing inline insertion unit 123, abstracts it into an interface specific to each NIC type, and passes it to the NIC 111.

In step S106, the NIC 111 transmits the packet to the NIC 211 of the server 200 connected thereto via the NW 1.

Figure 9:
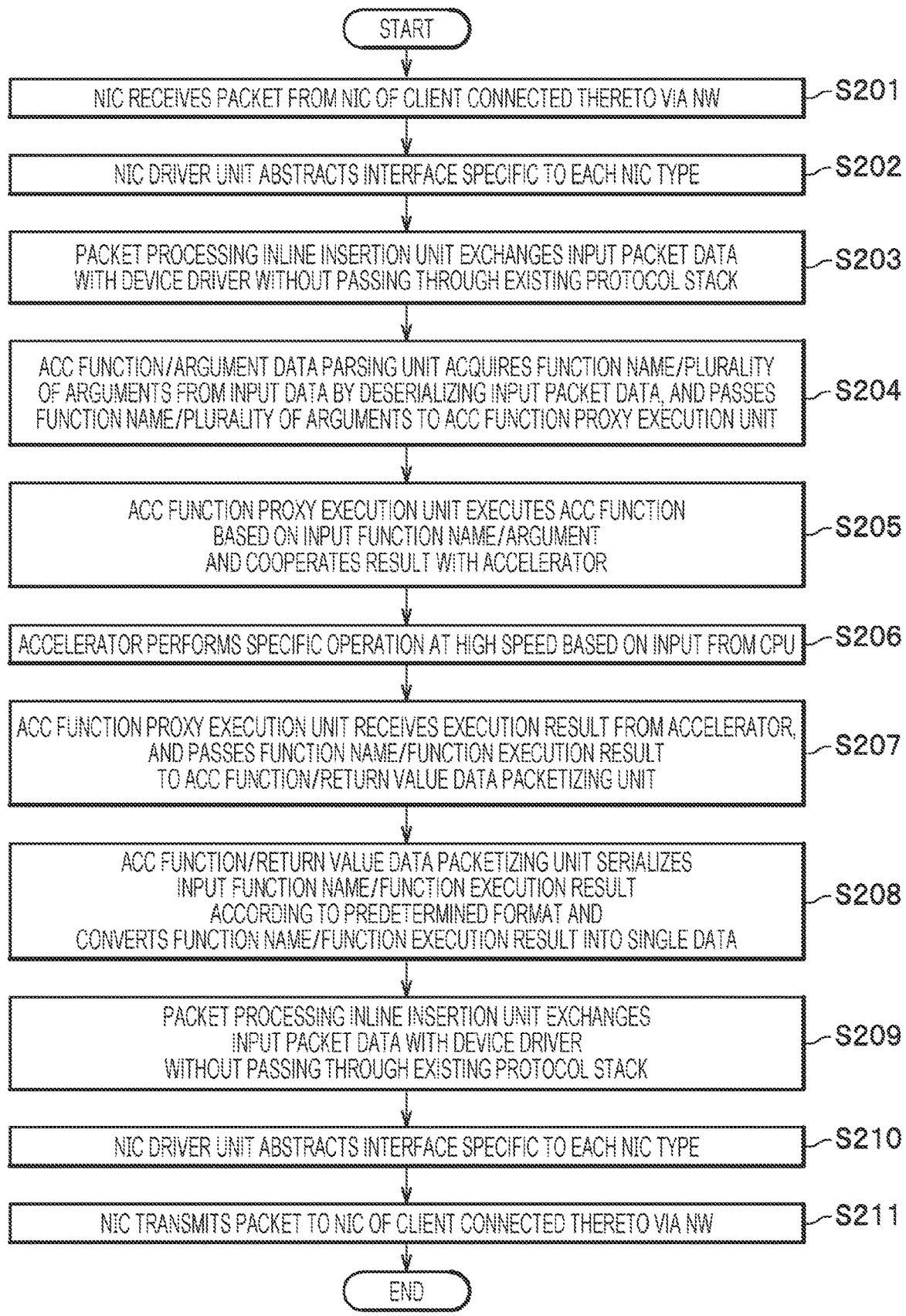
FIG. 9 is a flowchart illustrating offload processing of a server of the arithmetic processing offload system according to the embodiment of the present invention.

FIG. 9 is a flowchart illustrating offload processing (processing of S200 in FIG. 7) of the server 200 of the arithmetic processing offload system 1000 in FIG. 1.

In step S201, the NIC 211 receives a packet from the NIC 111 of the client 100 connected thereto via the NW 1.

In step S202, the NIC driver unit 224 abstracts an interface specific to each NIC type.

In step S203, the packet processing inline insertion unit 223 exchanges the input packet data with the device driver without passing through the existing protocol stack.

In step S204, the ACC function/argument data parsing unit 222 acquires a "function name/plurality of arguments" from the input data by deserializing the input packet data, and passes the function name/plurality of arguments to the ACC function proxy execution unit 231.

In step S205, the ACC function proxy execution unit 231 receives the "function name/argument" from the ACC function/argument data parsing unit 222, executes the ACC function based on the input "function name/argument", and cooperates the result with the accelerator 212.

In step S206, the accelerator 212 performs a specific operation at high speed based on the input from the CPU.

In step S207, the ACC function proxy execution unit 231 receives the "execution result" from the accelerator 212, and passes the "function name/function execution result" to the ACC function/return value data packetizing unit 221.

In step S208, the ACC function/return value data packetizing unit 221 serializes the input function name/function execution result according to a predetermined format, converts the function name/function execution result into single data, and outputs the single data as a "transmission packet".

In step S209, the packet processing inline insertion unit 223 exchanges the input packet data ("transmission packet") with the device driver (NIC driver unit 224) without passing through the existing protocol stack.

In step S210, the NIC driver unit 224 receives the "transmission packet" from the packet processing inline insertion unit 223, abstracts it into an interface specific to each NIC type, and outputs it to the NIC 211.

In step S211, the NIC 211 transmits the packet to the NIC 111 of the client 100 connected thereto via the NW 1.

FIG. 10 is a flowchart illustrating offload processing at the time of reception (processing of S300 in FIG. 7) by the client 100 of the arithmetic processing offload system 1000 in FIG. 1.

In step S101, the user application unit 131 makes an API call and outputs a "function name/argument".

In step S301, the NIC 111 receives a packet from the NIC 211 of the server 200 connected thereto via the NW 1.

In step S302, the NIC driver unit 124 receives the "received packet" from the NIC 111, abstracts it into an interface specific to each NIC type, and passes it to the packet processing inline insertion unit 123.

In step S303, the packet processing inline insertion unit 123 exchanges the input packet data ("received packet") with the device driver (NIC driver unit 124) without an existing protocol stack, and passes the "received packet" to the L3/L4 protocol/ACC function/return value data parsing unit 122.

In step S304, the ACC function/return value data parsing unit 122 acquires a function name/execution result from the input data by deserializing the input packet data, and passes the acquired function name/execution result to the ACC function proxy response unit 133.

In step S305, the ACC function proxy response unit 133 receives the "function name/execution result" from the ACC function/return value data parsing unit 122, and passes the "return value" to the user application unit 131.

In step S306, the user application unit 131 receives the function execution result from the ACC function proxy response unit 133.

[Hardware Configuration]

Figure 11:
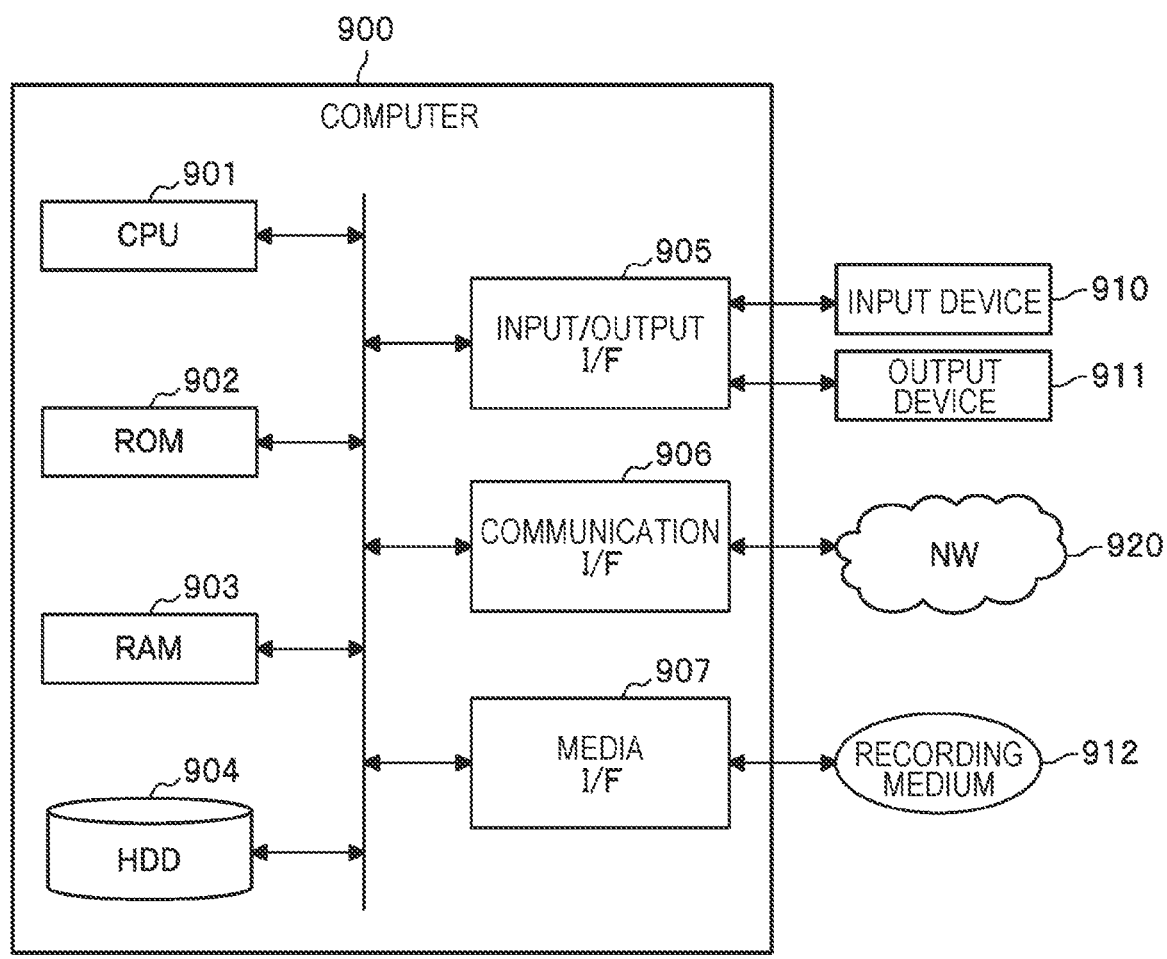
FIG. 11 is a hardware configuration diagram illustrating an example of a computer that implements functions of the client of the arithmetic processing offload system according to the embodiment of the present invention.

The client 100 of the arithmetic processing offload system 1000 according to the present embodiment is implemented by, for example, a computer 900 having a configuration as illustrated in FIG. 11.

FIG. 11 is a hardware configuration diagram illustrating an example of a computer 900 that implements functions of the client 100.

The computer 900 includes a CPU 901, a ROM 902, a RAM 903, an HDD 904, a communication interface (I/F) 906, an input/output interface (I/F) 905, and a media interface (I/F) 907.

The CPU 901 operates on the basis of a program stored in the ROM 902 or the HDD 904, and controls each unit of the client 100 illustrated in FIG. 1. The ROM 902 stores a boot program to be executed by the CPU 901 when the computer 900 is activated, a program depending on the hardware of the computer 900, and the like.

The CPU 901 controls, via the input/output I/F 905, an input device 910 such as a mouse or a keyboard, and an output device 911 such as a display. Via the input/output I/F 905, the CPU 901 acquires data from the input device 910, and outputs generated data to the output device 911. Note that a graphics processing unit (GPU) or the like may be used as a processor in conjunction with the CPU 901.

The HDD 904 stores a program to be executed by the CPU 901, data to be used by the program, and the like. The communication I/F 906 receives data from another device via a communication network (for example, a network (NW) 920), outputs the data to the CPU 901, and transmits data generated by the CPU 901 to another device via the communication network.

The media I/F 907 reads a program or data stored in a recording medium 912, and outputs the program or data to the CPU 901 via the RAM 903. The CPU 901 loads a program related to target processing from the recording medium 912 into the RAM 903 via the media I/F 907, and executes the loaded program. The recording medium 912 is an optical recording medium such as a digital versatile disc (DVD) or a phase change rewritable disk (PD), a magneto-optical recording medium such as a magneto-optical disk (MO), a magnetic recording medium, a conductor memory tape medium, a semiconductor memory, or the like.

For example, in a case where the computer 900 functions as the client 100 configured as a device according to the present embodiment, the CPU 901 of the computer 900 implements the function of the client 100 by executing a program loaded on the RAM 903. In addition, the HDD 904 stores data in the RAM 903. The CPU 901 reads the program related to the target processing from the recording medium 912, and executes the program. Additionally, the CPU 901 may read the program related to the target processing from another device via the communication network (NW 920).

Although the client 100 of the arithmetic processing offload system 1000 according to the present embodiment has been described above, the server 200 can also be implemented by the computer 900 having a similar configuration.

[Effects]

As described above, there is provided an arithmetic processing offload system including the client 100 and the server 200 connected to the client 100 via the NW 1, the client 100 offloads specific processing of an application to the accelerator 212 disposed in the server 200 to perform arithmetic processing, and the OS 120 of the client 100 includes: the ACC function/argument data packetizing unit 121 that serializes a function name/argument input from the application side according to a format of a predetermined protocol and packetizes the function name/argument as a payload; and the ACC function/return value data parsing unit 122 that deserializes packet data input from the server 200 side according to a format of a predetermined protocol and acquires a function name/execution result.

In this way, the OS 120 of the client 100 includes the ACC function/argument data packetizing unit 121 and the ACC function/return value data parsing unit 122 having a single dedicated function, and thus a plurality of pieces of protocol processing (L2, L3 protocol processing, packet pruning processing (NAPI), L4 protocol processing, ACC function parsing processing, and the like) required in the related art are eliminated and dedicated. Accordingly, on the client 100 side, it is possible to eliminate a process of selecting an L4/L3 protocol stack having a plurality of pieces of processing, and it is possible to achieve a low delay by eliminating the overhead in the data cooperation (first cooperation) between the "protocol stack" of the OS and the "ACC function/argument data". In the client 100, by reducing the number of times of selection and copying by data cooperation, there is no overhead and the high speed can be achieved.

Since the above is implemented by software inside the OS, it can be implemented without special function deployment to the NIC 111.

Further, there is provided an arithmetic processing offload system including the client 100 and the server 200 connected to the client 100 via the NW 1, the client 100 offloads specific processing of an application to the accelerator 212 disposed in the server 200 to perform arithmetic processing, and the OS 220 of the server 200 includes: the ACC function/argument data parsing unit 222 that deserializes packet data input from the client 100 side according to a format of a predetermined protocol and acquires a function name/plurality of arguments; and the ACC function/return value data packetizing unit 221 that serializes a function name/argument input from the accelerator 212 according to a format of a predetermined protocol and packetizes the function name/argument as a payload.

In this way, the OS 220 of the server 200 includes the ACC function/argument data parsing unit 222 and the ACC function/return value data packetizing unit 221 having a single dedicated function, and thus a plurality of pieces of protocol processing required in the related art are eliminated and dedicated. Accordingly, on the server 200 side, it is possible to eliminate a process of selecting an L4/L3 protocol stack having a plurality of pieces of processing, and it is possible to achieve a low delay by eliminating the overhead in the data cooperation (first cooperation) between the "protocol stack" and the "ACC function/argument data" of the OS. On the server 200 side, by reducing the number of times of selection and copying by data cooperation, there is no overhead and the high speed can be achieved.

Since the above is implemented by software inside the OS, it can be implemented without special function deployment to the NIC 211.

In the arithmetic processing offload system 1000, the OS 120 of the client 100 includes the packet processing inline insertion unit 123 that exchanges data with the ACC function/argument data packetizing unit 121, the ACC function/return value data parsing unit 122, and the NIC driver unit 124 that prunes data from the NIC 111 without passing through a predetermined protocol stack.

With this configuration, the packet processing inline insertion unit 123 is implemented by software inside the OS 120, and thus there is no special function deployment to the NIC, and a dedicated NIC is unnecessary, and versatility can be enhanced. In addition, the packet processing inline insertion unit 123 exchanges data with the NIC driver unit 124 that prunes data from the NIC 111 without passing through an existing protocol stack, and thus overhead between the ACC function/argument data packetizing unit 121 and the ACC function/return value data parsing unit 122 and the packet processing inline insertion unit 123 is eliminated by data cooperation (second cooperation), and high speed can be achieved.

Since the above is implemented by software inside the OS, it can be implemented without special function deployment to the NIC 111.

In the arithmetic processing offload system 1000, the OS 220 of the server 200 includes the packet processing inline insertion unit 223 that exchanges data with the ACC function/argument data parsing unit 222, the ACC function/return value data packetizing unit 221, and the NIC driver unit 224 that prunes data from the NIC 211 without passing through a predetermined protocol stack.

With this configuration, the packet processing inline insertion unit 223 is implemented by software inside the OS 220, and thus there is no special function deployment to the NIC, and a dedicated NIC is unnecessary, and versatility can be enhanced. In addition, the packet processing inline insertion unit 223 exchanges data with the NIC driver unit 224 that prunes data from the NIC 211 without passing through an existing protocol stack, and thus overhead between the ACC function/argument data parsing unit 222 and the ACC function/return value data packetizing unit 221 and the packet processing inline insertion unit 223 is eliminated by data cooperation (second cooperation), and high speed can be achieved.

Since the above is implemented by software inside the OS, it can be implemented without special function deployment to the NIC 211.

[Modifications]

(1)

The present embodiment is an example in which the present invention is applied to both the client 100 and the server 200. Accordingly, there is no overhead in both the client 100 and the server 200, and the high speed can be achieved. However, the present invention may be applied to either the client 100 or the server 200. For example, the client 100 may employ the configuration illustrated in FIG. 1, and the server 200 may employ the configuration illustrated in FIG. 13. Alternatively, the server 200 may employ the configuration illustrated in FIG. 1, and the client 100 may employ the configuration illustrated in FIG. 13. By leaving the related art on the system, it is possible to leave the way for general application to the existing system.

(2)

In the present embodiment, the packet processing inline insertion units 123 and 223 are disposed in both the client 100 and the server 200, but may be disposed in either one. Alternatively, the packet processing inline insertion units 123 and 223 may not be disposed. Although there is no synergistic effect with the present invention, there is an advantage that the system configuration can be simplified.

Note that, among the processes described in the above embodiment, all or some of the processes described as those to be automatically performed may be manually performed, or all or some of the processes described as those to be manually performed may be automatically performed by a known method. In addition, processing procedures, control procedures, specific name, and information including various types of data and parameters illustrated in the specification and the drawings can be arbitrarily changed unless otherwise specified.

In addition, each component of each device that has been illustrated is functionally conceptual, and is not necessarily physically configured as illustrated. In other words, a specific form of distribution and integration of individual devices is not limited to the illustrated form, and all or part of the configuration can be functionally or physically distributed and integrated in any unit according to various loads, usage conditions, and the like.

Further, some or all of the component, functions, processing units, processing means, and the like described above may be implemented by hardware, for example, by designing them in an integrated circuit. Also, the respective components, functions, and the like may be implemented by software for interpreting and executing a program for causing a processor to implement the respective functions. Information such as a program, a table, and a file for implementing the respective functions can be held in a recording device such as a memory, a hard disk, or a solid state drive (SSD), or in a recording medium such as an integrated circuit (IC) card, a secure digital (SD) card, or an optical disc.

REFERENCE SIGNS LIST

1 Network (NW)
100 Client
110 Client HW
111, 211 NIC
120 OS of Client
121 L3/L4 protocol/ACC function/argument data packetizing unit (accelerator function/argument data packetizing unit)
122 L3/L4 protocol/ACC function/return value data parsing unit (accelerator function/return value data parsing unit)
123, 223 Packet processing inline insertion unit
124, 224 NIC driver unit
130, 230 APL
131 User application unit
132 ACC function proxy receiving unit
133 ACC function proxy response unit
200 Server
210 Server HW
212 Accelerator
220 OS of server
221 L3/L4 protocol/ACC function/return value data packetizing unit (accelerator function/return value data packetizing unit)
222 L3/L4 protocol/ACC function/argument data parsing unit (accelerator function/argument data parsing unit)
231 ACC function proxy execution unit
450 ACC function/argument data packet
500 ACC Function/return value packet
1000 Arithmetic processing offload system

The invention claimed is:

1. An arithmetic processing offload system comprising a client device and a server connected to the client device via a network, the client device offloading specific processing of an application to an accelerator disposed in the server to perform arithmetic processing, wherein the client device comprises one or more processors and is installed with a first operating system (OS), wherein the first OS causes the one or more processors of the client device to perform a first set of operations comprising:

serializing a first input that comprises (i) a function name of a function for performing the arithmetic processing on one or more input arguments and (ii) values of the one more input arguments from the application according to a format of a predetermined protocol and packetizing the serialized first input as a single payload of a first packet, wherein the single payload comprises data specifying (i) the function name and (ii) at least a portion of the values of the one or more input arguments;

transmitting the first packet comprising the single payload to the server;

receiving a second packet comprising data specifying arithmetic processing result of the function from the server; and deserializing the second packet according to a format of a predetermined protocol to obtain the function name and the arithmetic processing result of the function; and wherein the server comprises one or more processors and is installed with a second OS that causes the one or more processors of the server to perform a second set of operations comprising:

deserializing the single payload of the first packet received from the client device according to a format of a predetermined protocol to obtain (i) the function name of the function for performing the arithmetic processing on the one or more input arguments and (ii) the at least a portions of the values of the one more input arguments from the application;

performing, using the accelerator, the arithmetic processing of the function based on the values of the one more input arguments;

serializing a second input from the accelerator that comprises (i) the function name of the function and (ii) arithmetic processing result of the function according to a format of a predetermined protocol and packetizing the serialized second input as a single payload of the second packet, wherein the single payload of the second packet comprises data specifying (i) the function name and (ii) the arithmetic processing result; and transmitting the second packet of the second packet comprising the single payload to the client device.

2. The arithmetic processing offload system according to claim 1, wherein the first set of operations further comprise:

exchanging data with an accelerator function/argument data packetizing unit, an accelerator function/return value data parsing unit, and a network interface card (NIC) driver unit without passing through a predetermined protocol stack, the NIC driver unit pruning data from an NIC.

3. The arithmetic processing offload system according to claim 1, wherein the second set of operations further comprise:

exchanging data with an accelerator function/argument data parsing unit, an accelerator function/return value data packetizing unit, and an NIC driver unit without passing through a predetermined protocol stack, the NIC driver unit pruning data from an NIC.

4. A client device of an arithmetic processing offload system including the client device and a server connected to the client device via a network, the client offloading specific processing of an application to an accelerator disposed in the server to perform arithmetic processing, wherein the client device comprises one or more processors and is installed with an operating system (OS) that causes the one or more processors of the client device to perform operations comprising:

serializing an input that comprises (i) a function name of a function for performing the arithmetic processing on one or more input arguments and (ii) values of the one more input arguments from the application according to a format of a predetermined protocol and packetizing the serialized input as a single payload of a first packet, wherein the single payload comprises data specifying (i) the function name and (ii) at least a portion of the values of the one or more input arguments;

transmitting the first packet comprising the single payload to the server;

receiving a second packet comprising data specifying arithmetic processing result of the function from the server; and deserializing the second packet according to a format of a predetermined protocol to obtain the function name and the arithmetic processing result of the function.

5. The client device of claim 4, wherein the serializing comprises converting the function name and the values for the one or more arguments into a byte stream.

6. The client device of claim 4, wherein the predetermined protocol specifies a format for arranging the function name and values of the one or more arguments within the serialized input.

7. The client device of claim 4, wherein the predetermined protocol specifies one or more control bits for managing data size.

8. The client device of claim 7, wherein the control bits further indicate when an argument has been divided into multiple packets for transmission.

9. The client device of claim 4, wherein the packetizing further comprises:

including an identifier that uniquely identifies the accelerator in the first packet.

10. The client device of claim 4, wherein the serializing comprises representing the function name as a function identifier.

11. A server of an arithmetic processing offload system including a client device and a server connected to the client device via a network, the client device offloading specific processing of an application to an accelerator disposed in the server to perform arithmetic processing, wherein the server comprises one or more processors and is installed with an operating system (OS) that causes the one or more processors of the server to perform operations comprising:

deserializing a single payload of a first packet received from the client device according to a format of a predetermined protocol to obtain (i) a function name of a function for performing the arithmetic processing on one or more input arguments and (ii) values of the one more input arguments from the application;

performing, using the accelerator, the arithmetic processing of the function based on the values of the one more input arguments;

serializing an input from the accelerator that comprises (i) the function name of the function and (ii) arithmetic processing result of the function according to a format of a predetermined protocol and packetizing the serialized input as a single payload of a second packet, wherein the single payload of the second packet comprises data specifying (i) the function name and (ii) the arithmetic processing result; and transmitting the second packet comprising the single payload of the second packet to the client device.

* * * * *